United States Patent [19]
Herz et al.

[11] Patent Number: 5,990,965
[45] Date of Patent: Nov. 23, 1999

[54] SYSTEM AND METHOD FOR SIMULTANEOUS FLICKER FILTERING AND OVERSCAN COMPENSATION

[75] Inventors: William S. Herz, Newark; Yichou Lin, Santa Clara, both of Calif.

[73] Assignee: S3 Incorporated, Santa Clara, Calif.

[21] Appl. No.: 08/942,143

[22] Filed: Sep. 29, 1997

[51] Int. Cl.⁶ ........................................... H04N 7/01
[52] U.S. Cl. .............................. 348/446; 348/447; 348/910
[58] Field of Search .................................. 348/607, 606, 348/625, 628, 447, 448, 910, 446; H04N 7/01, 5/21, 11/20

[56] References Cited

U.S. PATENT DOCUMENTS

| | | | |
|---|---|---|---|
| 5,019,904 | 5/1991 | Campbell | 348/446 |
| 5,168,358 | 12/1992 | Ishizu et al. | 348/446 |
| 5,510,843 | 4/1996 | Keene et al. | 348/446 |
| 5,812,203 | 9/1998 | Swan et al. | 348/446 |
| 5,822,008 | 10/1998 | Inoue et al. | 348/446 |

*Primary Examiner*—Chris Grant
*Attorney, Agent, or Firm*—Fenwick & West LLP

[57] ABSTRACT

An apparatus simultaneously flicker filters and vertically contracts a plurality of original lines to form compensated lines. The device uses a coefficient calculator and a line processor, both controlled by a controller. The coefficient calculator provides compensation coefficients to the line processor. The line processor forms weighted sums of the original lines, with the weightings determined by the compensation coefficients. The compensation coefficients are chosen to simultaneously implement flicker filtering and vertical contraction. Thus, the weighted sums are the compensated lines.

22 Claims, 17 Drawing Sheets

| Original Lines | Vertically Contracted Lines | Compensated Lines | ID |
|---|---|---|---|
| L1 | L1' = L1 | L1'' = 7/28L1 + 12/28L2 + 7/28L3 + 2/28L4 | (1,2) |
| L2 | L2' = 6/7L2 + 1/7L3 | L2'' = 6/28L2 + 11/28L3 + 8/28L4 + 3/28L5 | (2,3) |
| L3 | L3' = 5/7L3 + 2/7L4 | L3'' = 5/28L3 + 10/28L4 + 9/28L5 + 4/28L6 | (3,4) |
| L4 | L4' = 4/7L4 + 3/7L5 | L4'' = 4/28L4 + 9/28L5 + 10/28L6 + 5/28L7 | (4,5) |
| L5 | L5' = 3/7L5 + 4/7L6 | L5'' = 3/28L5 + 8/28L6 + 11/28L7 + 6/28L8 | (5,6) |
| L6 | L6' = 2/7L6 + 5/7L7 | L6'' = 2/28L6 + 7/28L7 + 12/28L8 + 7/28L9 | (6,7) |
| L7 | L7' = 1/7L7 + 6/7L8 | L7'' = 1/28L7 + 6/28L8 + 14/28L9 + 6/28L10 + 1/28L11(0,9) | |
| L8 | L8' = L9 | L8'' = 7/28L9 + 12/28L10 + 7/28L11 + 2/28L12 (1,10) | |
| L9 | L9' = 6/7L10 + 1/7L11 | | |
| L10 | L10' = 5/7L11 + 2/7L12 | | |
| L11 | | | |
| L12 | | | |

Figure 2

SYSTEM AND METHOD FOR SIMULTANEOUS FLICKER FILTERING AND OVERSCAN COMPENSATION

BACKGROUND OF THE INVENTION

1. Field of the Invention

This invention relates generally to processing of computer graphics for display on a television, and more particularly, to the simultaneous flicker filtering and vertical contraction of computer graphics.

2. Description of the Related Art

As the result of the continuous development of new technologies, the distinction between computers, in particular computer monitors, and televisions is becoming increasingly blurred. In other words, the computer and television industries are converging. For example, computer networks such as the Internet and the World Wide Web used to be almost exclusively a computer phenomena. Now, however, televisions may also be used to access these networks. As another example, broadcast entertainment used to belong squarely in the television domain. Now, however, many service providers are offering entertainment to computer users through computer networks. As a result of this convergence, there is a need to display computer graphics intended for computers on televisions.

Televisions and computers, however, generally use incompatible graphics formats. For example, a non-interlaced 640 ×480 data format is common among computer monitors and LED displays, especially desktop and laptop versions. In this format, each frame of computer graphics is represented as 480 horizontal lines consisting of 640 pixels each, and the entire frame is updated at once. In contrast, consider the NTSC format, a common television format. This format consists of 484 active horizontal lines, only approximately 420 of which are displayed, the actual number displayed varying from one television set to another. In addition, the NTSC format is interlaced, meaning that the frame is divided into odd and even fields and only one field or half the frame is updated at a time.

As a result, in order to display computer graphics on a television, the computer graphics often improve image quality by flicker filtering. Flicker filtering reduces visual effects that arise as a result of the conversion from a non-interlaced to an interlaced format. Vertical contraction squeezes the larger computer format into a smaller television format. Using the two example formats described above, the 480 lines of computer graphics would be vertically contracted to fit into the 420 lines of television display.

The prior art has attempted to accomplish flicker filtering using a variety of techniques known in the art, such as using low pass filters. However, one problem with existing techniques is that they require several line buffers which in turn increases the complexity and cost of converting computer graphics to a useful television format.

Thus, there is a need to simultaneously perform flicker filtering and vertical contraction. In addition, there is a need to perform these operations while minimizing hardware requirements.

SUMMARY OF THE INVENTION

In accordance with the present invention, a device for simultaneously flicker filtering and vertically contracting a plurality of original lines to form compensated lines preferably includes a coefficient calculator, a line processor, a line buffer and a controller.

The line processor receives original lines from a source providing graphic data in a format suitable for display on a computer and also receives compensation coefficients from the coefficient calculator. The line processor combines the received original lines with the received compensation coefficients to form compensated lines. The output of the line processor is provided to and stored in the line buffer. The controller synchronizes the receipt by the line processor of the original lines with the receipt of the compensation coefficients, and storage of the compensated lines in the line buffer. The present invention is particularly advantageous because the flicker filtering and vertically contracting can be done simultaneously using the architecture described above to apply coefficients under direction of the controller. Moreover, in one embodiment, only a single line buffer in addition to the frame buffer is needed for simultaneously flicker filtering and vertically contracting. In other embodiments, a minimum number of line buffers are used without use of the frame buffer. In further accordance with the present invention, a method for simultaneously flicker filtering and vertically contracting a plurality of original lines comprises the following steps: 1) determining compensation coefficients for simultaneously flicker filtering and vertically contracting the original lines; 2) generating a plurality of weighted sums of the original lines, with the weighting of the original lines determined by the compensation coefficients; and 3) using the weighted sums as the compensated lines.

BRIEF DESCRIPTION OF THE DRAWINGS

The present invention has other advantages and features which will be more readily apparent from the following detailed description of the invention and the appended claims, when taken in conjunction with the accompanying drawing, in which:

FIG. 2 is a signal flow chart illustrating a first method for compensation based on vertical contraction followed by flicker filtering, in accordance with the present invention;

DETAILED DESCRIPTION OF THE PREFERRED EMBODIMENTS

Figure 1:
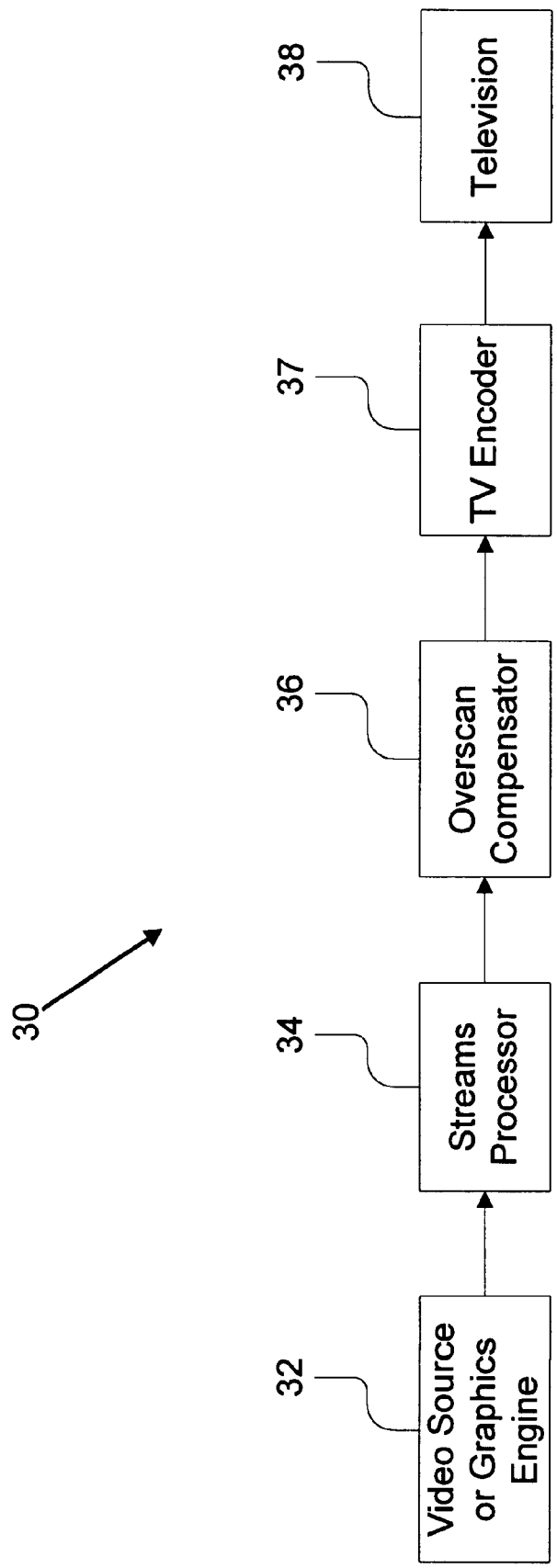
FIG. 1 is a block diagram of a system including the present invention.

FIG. 1 is a block diagram of a system 30 in accordance with the invention. The system 30 includes a video source or graphics engine 32, a streams processor 34, an overscan compensator 36, a TV encoder, and a television 38. The video source 32 is coupled to transmit computer graphics primitives to the streams processor 34. The streams processor 34 in turn generates pixel values based the desired format as determined by the resolution of image being generated and the number of colors used. Examples of such streams processors are included in the Trio 64 and Virge graphic accelerators manufactured and sold by S3 Incorporated of Santa Clara, Calif. The pixels values for the image are formatted in lines and provided to the overscan compensator 36. The overscan compensator 36 flicker filters and vertically contracts the original lines to produce compensated lines and outputs them to the TV encoder 37. The TV encoder receives the data (e.g. YUV) from the overscan compensator 36 and converts it to a suitable NTSC or PAL signal suitable for use with the television 38. The TV encoder 37 is coupled to transmit the converted and compensated lines to the television 38 for display.

Figure 3:
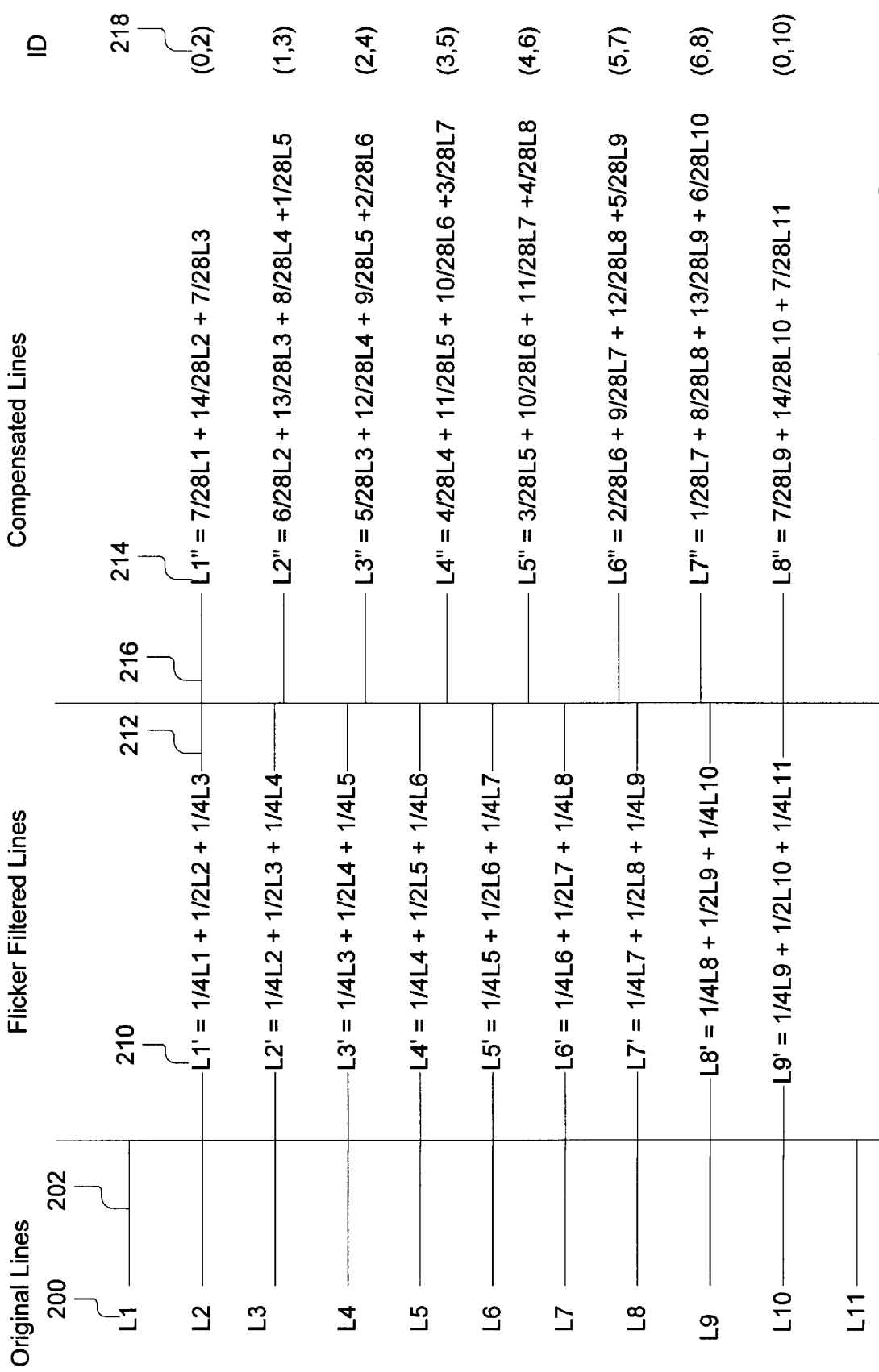
FIG. 3 is a signal flow chart illustrating a second method for compensation based on flicker filtering followed by vertical contraction, in accordance with the present invention.

FIGS. 2 and 3 are signal flow charts illustrating two embodiments of the flicker filtering and vertical contraction performed by the overscan compensator 36. In these two examples, the vertical contraction is a ⅞ contraction, and the flicker filtering is based on a digital filter having coefficients ¼, ½, ¼. While particular values will be used as examples for contraction and the digital filter, those skilled in the art will realize that the system and method of the present invention is fully programmable in that the contraction and coefficients may be adjusted to provide a myriad of contraction levels and flicker filtering. For example, a preferred option for the programmable coefficients is that they are (½(1−f), f, ½(1−f)) where 0<f <1.

FIG. 2 illustrates a first compensation method based on first vertically contracting and then flicker filtering the original lines. The original lines 200 are represented by L1, L2, etc., with the vertical position of each original line 200 represented by the corresponding short horizontal lines 202. While for the purposes of the present application the lines will be referred to as odd and even lines and the original frame is assumed to begin with an odd line, line L1, it will be readily apparent to those skilled in the art that the present invention applies equally where the frame begins with an even line, denoted L0, and that the references to odd and even line need only be reversed for such a case.

The original lines 200 are first vertically contracted to form the vertically contracted lines 204, represented by L1', L2', L3', etc. The vertical positions of the contracted lines 204 are represented by the short horizontal lines 206. Thus, for example, the vertically contracted line L1' is vertically aligned with the original line L1, the vertically contracted line L2' represents a vertical position located between the original lines L2 and L3 but closer to L2 since it most formed form L2. Similarly, the other vertically contracted lines 206 are positioned relative to the original lines. Since FIG. 2 is based on a ⅞ contraction of the original lines 200, for every eight original lines 200, there are seven vertically contracted lines 204. For example, the eight original lines L1 to L8 correspond to the seven vertically contracted lines L1' to L7'. This can be seen best by referring to line L'8 since L1 is aligned with L1', while L9 is also aligned with L8'.

Each of the vertically contracted lines 204 is preferably formed by using a drifting bilinear interpolation of the two original lines 200 which flank it. For example, L2' is flanked by original lines L2 and L3 and therefore is formed by a bilinear interpolation of L2 and L3. Since L2' is closer to L2 than to L3, L2 is more heavily weighted than L3. Specifically, L2' =⁶⁄₇L2+¹⁄₇L1, as shown in FIG. 2. The drifting bilinear interpolation is apparent from the expressions for L2' through L7', as shown in FIG. 2. Vertically contracted lines 204 such as L1' and L8', which align with original lines 200, do not require the interpolation of two original lines 200, as shown in FIG. 2.

The vertically contracted lines 204 are next flicker filtered to produce the compensated lines 208, represented by L1", L2", L3", etc. The odd field for the interlaced display includes lines L1", L3", L5", etc.; while the even field includes lines L2", L4", L6", etc. The relative vertical positions of the compensated lines 208 are represented by the short horizontal lines 210 in FIG. 2. Each of the compensated lines 208 aligns with one of the vertically contracted lines 204 so no interpolation is required. However, the vertically contracted lines 204 are filtered since the compensated lines 208 are intended to be displayed in an interlaced fashion. For example, L1"≠L2'. Rather, L1"=¼L1'+½L2'+¼L3'. Similarly, L2"=¼L2'+½L3'+¼L4'. In this embodiment, the compensated lines 208 are formed by filtering the vertically contracted lines 204 by a filter having coefficients (¼, ½, ¼).

FIG. 2 gives the expressions for each of the compensated lines 208 in terms of the original lines 200. Forming the compensated lines 208 directly from the original lines 200 via these expressions effectively performs simultaneous flicker filtering and vertical contraction of the original lines 200. Avoiding formation of the intermediate vertically contracted lines 204 has advantages of accelerating the formation of the compensated lines 208 and reducing the corresponding hardware requirements.

Each compensated line 208 is a weighted sum of original lines 200, as can be seen from the expressions in FIG. 2. In the embodiment of FIG. 2, in which the original lines 200 are effectively first vertically contracted and then flicker filtered, the compensated lines 208 are a weighted sum of not more than five original lines 200. More specifically, each compensated line 208 can be expressed as $$LJ''=\Sigma\ Cn \cdot L(An) \qquad (EQN.1)$$

where J is the line number of the compensated line 208, Cn is the coefficient of term n, An is the line number of the original line 200 of term n, and the summation is over n. For example, referring to L3", the line number J=3; the coefficients Cn are C1=⁵⁄₂₈, C2=¹⁰⁄₂₈, C3=⁹⁄₂₈, and C4=⁴⁄₂₈; and the line numbers An are A1=3, A2=4, A3=5, and A4=6. Those skilled in the art will recognize that the line numbers and coefficients for the entire screen can be generated from equations shown if FIG. 2 since the patterns of coefficients and number of lines summed is repeated every eight lines.

For clarity, the term "compensation coefficient" will be used to refer to the coefficients describing the compensated lines 208. The Cn in EQN. 1 are compensation coefficients. As a specific example, the compensation coefficients for L1" are $7/28$, $12/28$, $7/28$, and $2/28$. The term "contraction coefficients" will be used to refer to the coefficients used to vertically contract lines. The coefficients 1, $6/7$ and $1/7$, $5/7$ and $2/7$, etc., which define the bilinear interpolation in FIG. 2, are examples of contraction coefficients. The term "flicker coefficients" will be used to refer to coefficients used to flicker filter lines. The coefficients ($1/4$, $1/2$, $1/4$) are examples of flicker coefficients. The term "coefficient" may be used when the type of coefficient is clear from the context.

The line numbers J and An will be used to reference lines, and the index n to reference terms in the summation of EQN. 1. However, those of ordinary skill will recognize other addressing methods. For example, the original lines may be stored in a frame buffer and addressed by their location within the frame buffer rather than the line number An. Those skilled in the art will appreciate that the present invention could alternatively be implemented partially in software by requesting the data from the streams processor in the line order desired (an irregular sequence), and thereby eliminate use of the frame buffer for this operation.

Each compensated line 208 can also be identified by an index I and a variable D 211, as shown in FIG. 2. Roughly speaking, the index I determines the coefficients Cn and the variable D determines the line numbers An for each weighted sum. For example, the compensated lines L1" and L8" both have I=1. Accordingly, they use the same coefficients Cn for their weighted sums: $7/28$, $12/28$, $7/28$ and $2/28$. However, L1" and L8" have different values of D. Therefore, the original lines 200 to be weighted and summed are different. L1" has variable D=2 and so the corresponding weighted sum begins with original line L1 (L[D−1]=L2−1= L1); while L8" has D=10 and so begins with original line L9 (L[D−1]=L10−1=L9). The present invention preferably uses a programmable definition for the coefficients of ($1/2(1-f)$, f, $1/2(1-f)$) where $0<f<1$. The value of f is preferably $1/2$, however other suitable values of f include $2/16$, $4/16$, $6/16$, $10/16$, $12/16$, $14/16$.

FIG. 3 illustrates an second embodiment of the method based on first flicker filtering and then vertically contracting the original lines 200, using the same flicker filtering and vertical contraction operations as in FIG. 2. The flicker filtered lines 210 are represented by L1', L2', etc. and their vertical positions by the short horizontal lines 212 in FIG. 2. The flicker filtered lines 210 align with the original lines 200 so no interpolation is required. As in FIG. 2, the flicker filter operation is a linear filtering, which is apparent from the expressions for the flicker filtered lines 210, as shown in FIG. 3. The flicker filtered lines 210 are vertically contracted using the same bilinear interpolation as in FIG. 2 to form the compensated lines 214, represented by L1", L2", etc., and the short horizontal lines 216. The vertical contraction is preferably again $7/8$. Therefore, the seven compensated lines L1" to L7" correspond to the eight flicker filtered lines L1' to L8'. The odd field for the interlaced display includes lines L1", L3", etc.; while the even field includes lines L2", L4", etc., as in FIG. 2.

The compensated lines 214 are expressed as weighted sums of the original lines 200, as in FIG. 2. EQN. 1, therefore, is also applicable to the second embodiment. In this embodiment, however, the weighted sums include not more than four original lines 200. The advantages of forming the compensated lines 214 directly from the original lines 200, as discussed in conjunction with FIG. 2, also apply to this embodiment. Each compensated line 214 can also be identified by an index I and variable D 218, which play similar roles as in FIG. 2.

Figure 4:
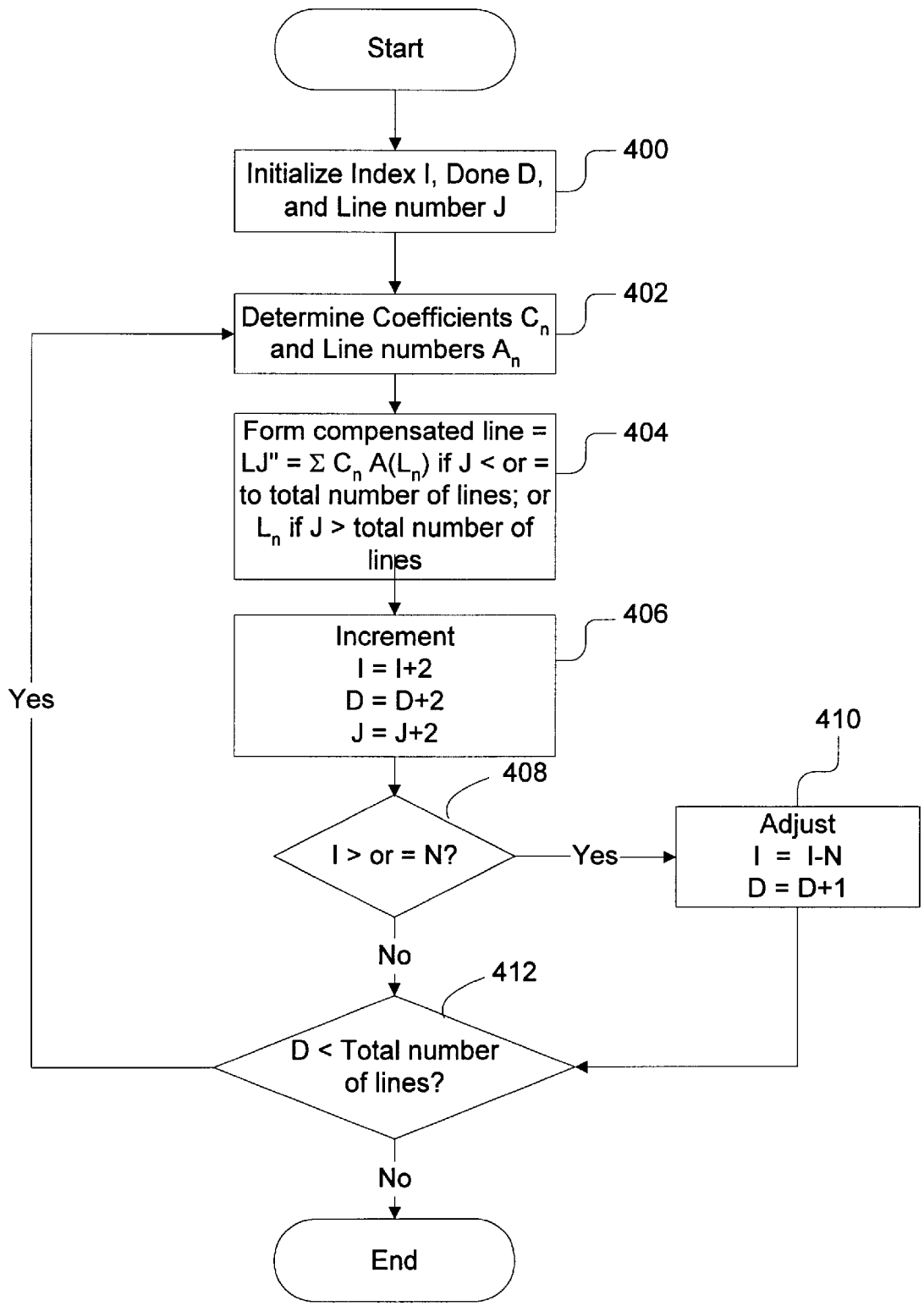
FIG. 4 is a flow chart of the process for compensation according to the embodiments illustrated in FIGS. 2 and 3.

FIG. 4 is a flow chart of the preferred process for generating the flicker filtered and overscan compensated values according to the embodiments illustrated in FIGS. 2 and 3 for the general case of vertical contraction by a factor of N/(N+1). In the examples of FIGS. 2 and 3, N=7 since the vertical contraction was $7/8$. The process described below is used to generate the pixel values for a field, where a field is alternating lines of a frame (half the lines of a frame) that can directly be used by the television 38 to render the image. Thus, the process described below can be used to generate either the odd fields or even fields. The process begins by initializing 400 the index I, variable D, and compensated line number J. The coefficients Cn and original line numbers An used to form compensated line J are then determined 402. The compensated line is formed 404 according to EQN. 1 above. In step 404, the compensated line is formed using EQN. 1 above as long as the compensated line number, J, is less than the total number of lines. Once J is greater than the total number of lines, the previous value of Ln is used for the compensated line. As the last line of the frame is reached, there is not data for lines with greater number since the end of the frame has been reached. In such a case, the compensation for the previous line is again used. The condition in step 404 is provided to handle the last line of the frame case. Once the compensated line is formed 404, I, D, and J are incremented 406 in preparation for forming the next compensated line. I, D, and J are incremented by two rather than one, since only every other compensated line 208 or 214 is required in an interlaced format. For a non-interlaced format the increment could be one. After incrementing, the process determines whether $I \geq N$ in step 408, then I and D are adjusted 410 if $I \geq N$ in step 410. Specifically, I is decremented by N and D is incremented by 1. If $I \geq N$, this indicates the coefficients are repeating such as in the transition between lines L7" and L8" of FIG. 2 and the index must be reset. Otherwise, the process proceed directly to step 412. In step 412, the method tests if D is less than the total number of lines in the frame 412, and the process loops around to determine 402 the coefficients and line numbers for the next compensated line if D is less than the total number of lines in the frame 412. Otherwise, the process is completed and ends in step 414 for this field.

Figure 5A:
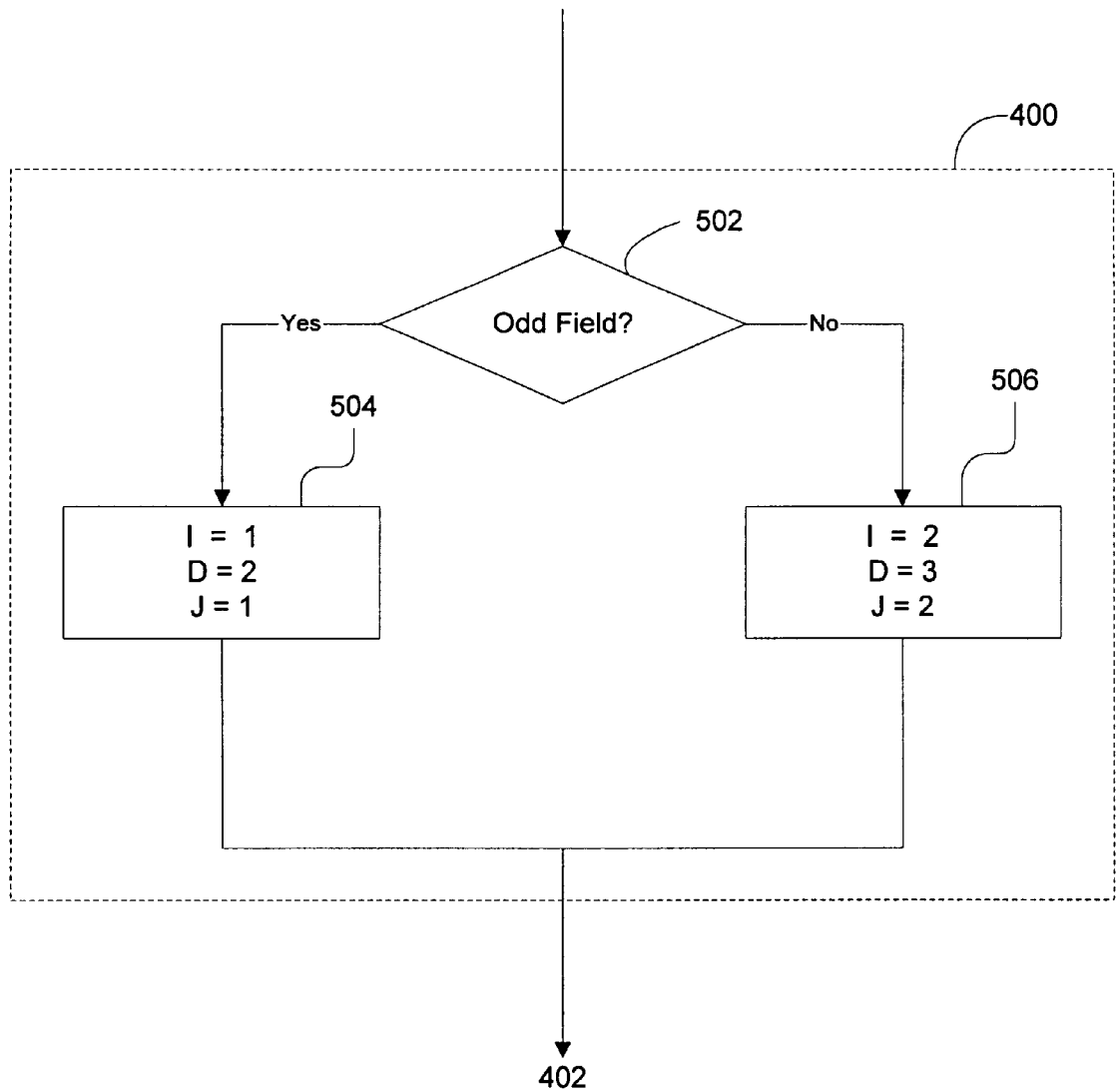
FIG. 5A is a flow diagram of the steps of initializing the coefficients and line numbers from FIG. 4, in accordance with the embodiment illustrated in FIG. 2.
Figure 5B:
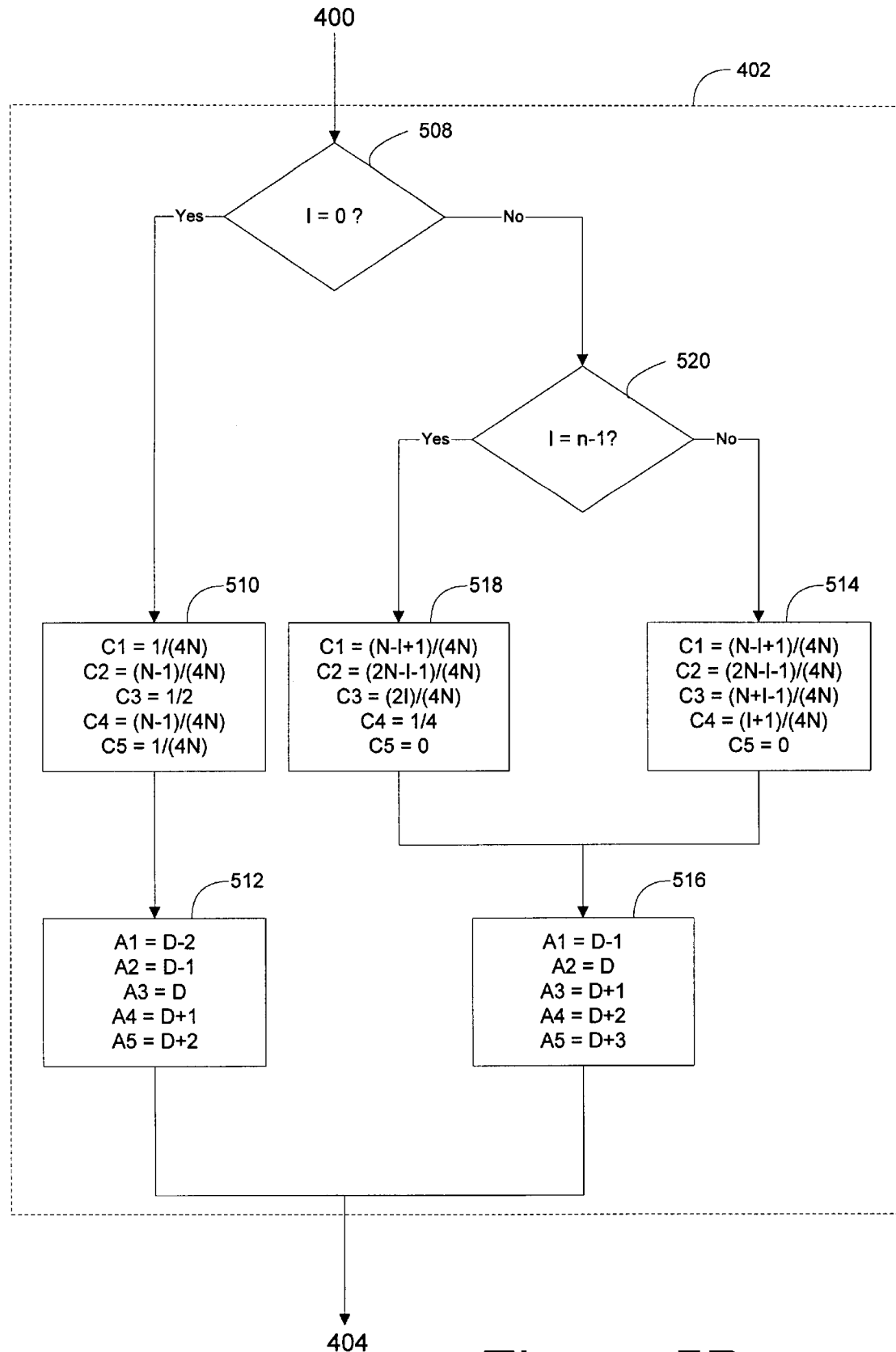
FIG. 5B is a flow diagram of the steps of determining coefficients and line numbers from FIG. 4, in accordance with the embodiment illustrated in FIG. 2.

FIGS. 5A and 5B are flow charts of the step of initializing 400 and the step of determining 402, respectively, from FIG. 4, in accordance with the embodiment illustrated in FIG. 2. FIGS. 5A and 5B show details for the embodiment based on first vertically contracting and then flicker filtering the original lines 200. Referring now to FIG. 5A, the step of initializing 400 begins by determining in step 502 whether the field is odd or even. If an odd field is being formed, then the method continues to step 504 where I, D and J are set to the following values: I=1, D=2, and J=1. On the other hand if step 502 determines an even field is being formed, the method continues in step 506 by setting the I, D and J to the initialization values I=2, D=3, and J=2 in step 506. After performing either step 504 or step 506, the method proceeds to step 402. Those skilled in the art will recognize how the values of I, D and J can be initialized based on the amount of contraction and compensation.

Referring to FIG. 5B, the step 402 of determining coefficients Cn and line numbers An begins in step 508 by determining whether I=0. If I=0, then coefficients and line numbers are given by performing steps 510 and 512, and the method proceeds to step 510. In step 510, the values of C1 to C5 are calculated using the equations: C1=1/(4N); C2=(N−1)/(4N); C3=(2N)/(4N); C4=(N−1)/(4N); and C5=1/(4N). Next in step 512, the values of A1 to A5 are calculated using the equations: A1=D−2; A2=D−1; A3=D; A4=D+1; and A5=D+2. After completion of step 512, the method continues in step 404. For non-zero values of I, the method continues to step 520 where the method determines whether I is equal to n minus one (I=n−1). If I is not equal to n minus one, the coefficients and line numbers are given by performing steps 514 and 516. First in step 514, the values of C1 to C5 are calculated using the equations: C1=(N−I+1)/(4N); C2=(2N−I−1)/(4N); C3=(N+I−1)/(4N); C4=(I+1)/(4N); and C5=0. The coefficient C5=0 is included in block 514 so that the weighted sum will always contain five terms. Then in step 516, the method the values of A1 to A5 are calculated using the equations: A1=D−1; A2=D; A3=D+1; A4=D+2; and A5=D+3. If in step 520, it was determined that I was equal to n minus one, then the method performs step 518 before proceeding to step 516, as opposed to step 514 as described above. In step 518, the values of C1 to C5 are calculated using the equations: C1=(N−I−1)/(4N); C2=(2N−I−1)/(4N); C3=(2I)/(4N); C4=(N)/(4N); and C5=0. After step 518, the values of A1 to A5 are calculated as has been described above. After completion of step 516, the method continues in step 404. Those skilled in the art will recognize how these coefficients can be similarly generated for different levels of contraction and values of flicker filtering other than (¼, ½, ¼)

Figure 6A:
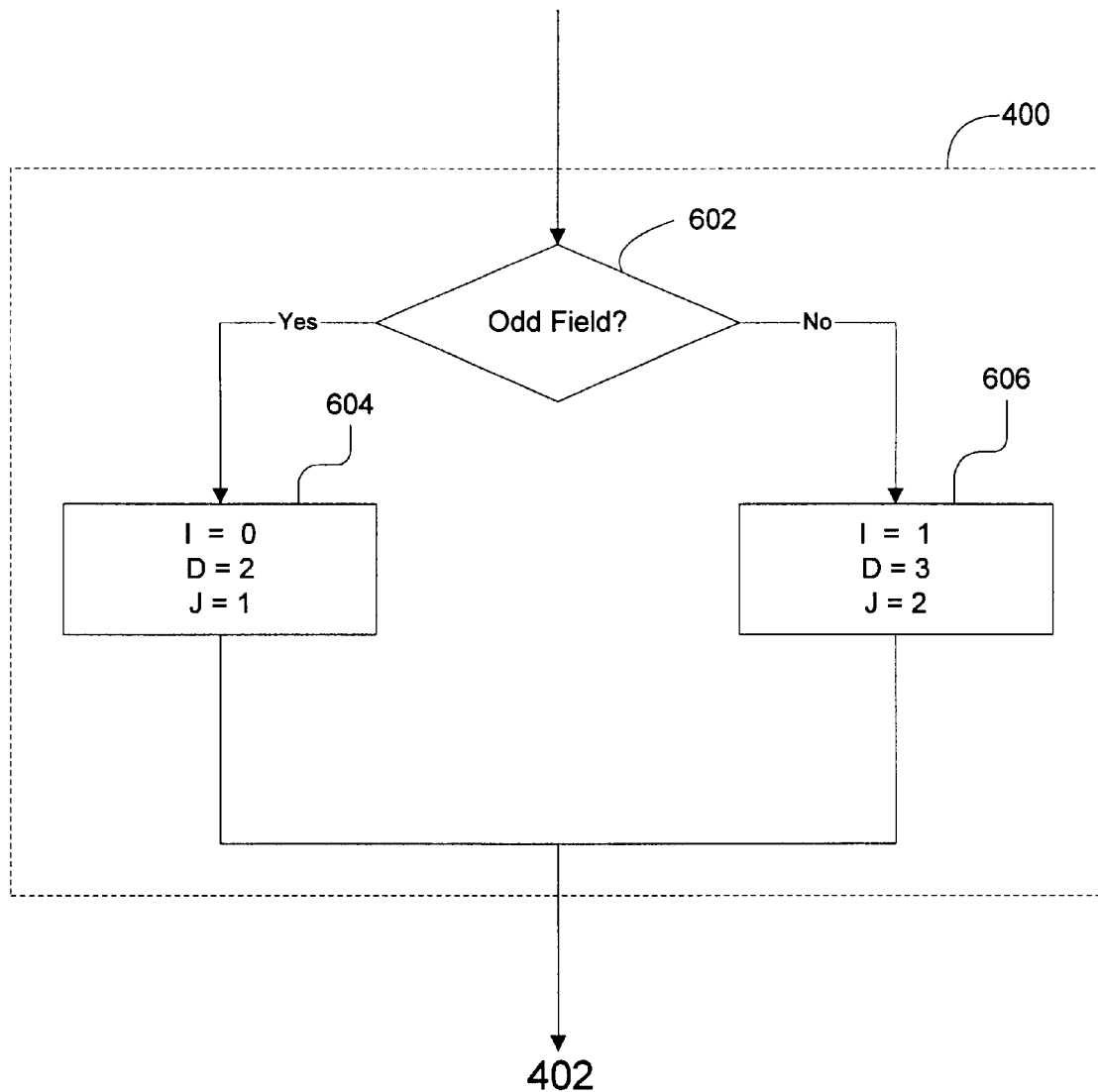
FIG. 6A is a flow diagram of the steps of initializing the coefficients and line numbers from FIG. 4, in accordance with the embodiment illustrated in FIG. 3.
Figure 6B:
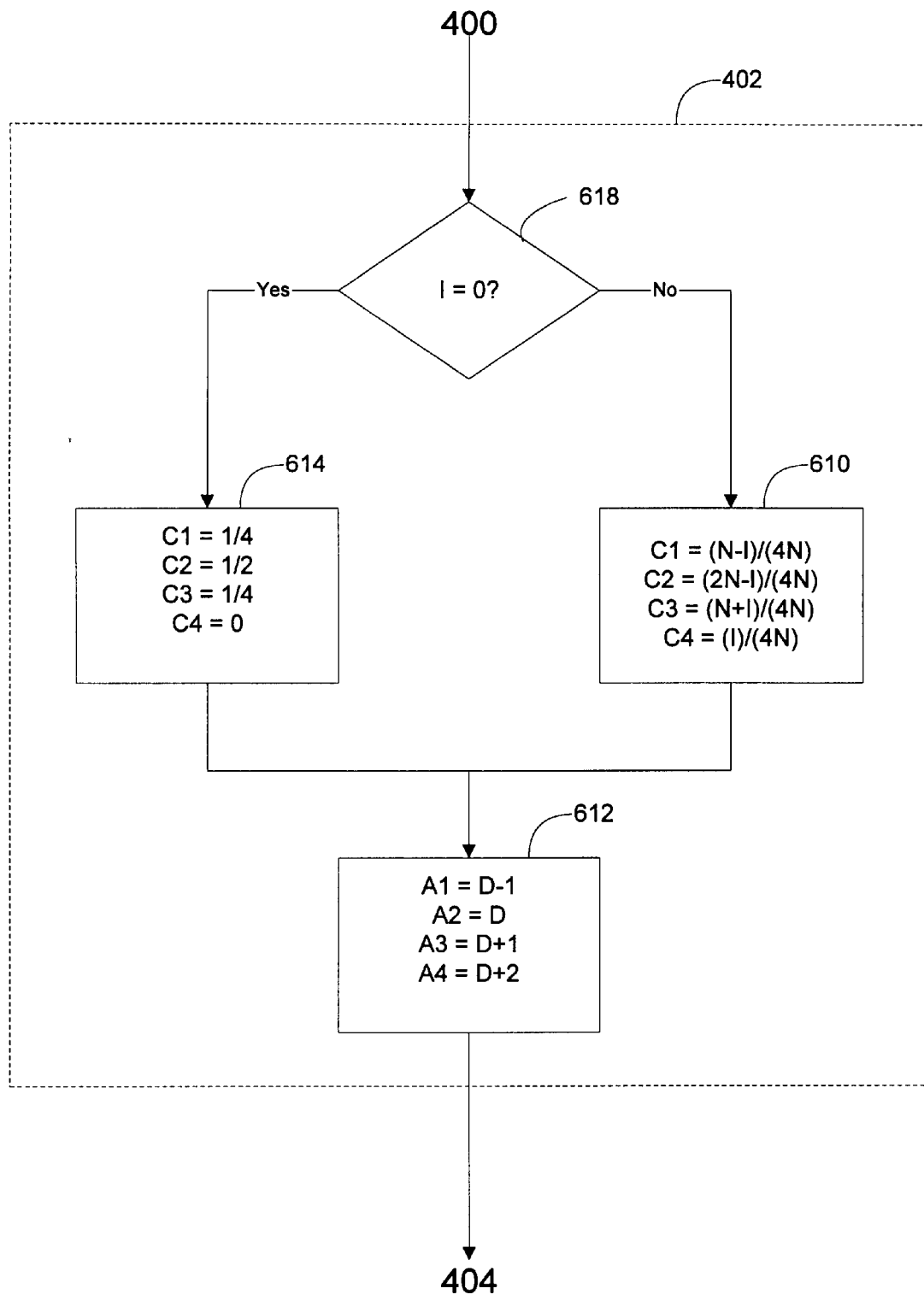
FIG. 6B is a flow diagram of the steps of determining coefficients and line numbers from FIG. 4, in accordance with the embodiment illustrated in FIG. 3.

FIGS. 6A and 6B are flow diagrams of the steps of initializing 400 and determining 402 from FIG. 4, in accordance with the second method illustrated in FIG. 3 that is based on first flicker filtering and then vertically contracting the original lines 200. Referring to FIG. 6A, step of initializing includes three steps. The method begins by determining in step 602 whether the field is odd or even. If it is determined in step 602 that the field is an odd field, the process continues in step 604 where the variables are set to the following values: I=0, D=2, and J=1. Otherwise if it is determined in step 602 that the field is an even field, the process continues in step 606 by setting the variables as follows: I=1, D=3, and J=2. After either step 604 or 606, the process continues in step 404.

Referring to FIG. 6B, step 402 of determining 402 coefficients and line numbers is defined by the sub-steps shown. First in step 618, the method determines whether I is equal to zero (I=0). If so, the method set the values of C1 to C4 to be ¼, ½, ¼ and 0, respectively in step 614 before continuing to step 612. On the other hand, if method determines I is not equal to zero in step 618, the method proceeds to step 610, where the method determines the values of C1 to C4 using the equations: C1 =(N−I)/(4N); C2=(2N−I)/(4N); C3=(N+I)/(4N); and C4=(I)/(4N). After either step 610 or 614, the values of A1 to A5 are calculated using the equations: A1=D−1; A2=D; A3=D+1; and A4=D+2, in step 612. After completion of step 612, the method continues in step 404.

FIGS. 7–14 illustrate devices which may be used with the methods described in FIGS. 2–6. These devices and their operations are described in the context of forming an odd field using the method illustrated in FIG. 3; and, more specifically, in the context of forming the compensated lines L1", L3", etc. of FIG. 3. It should be understood, however, that the following devices are not limited to this specific context, and may be used to create the even fields or a variety of other contexts.

Figure 7:
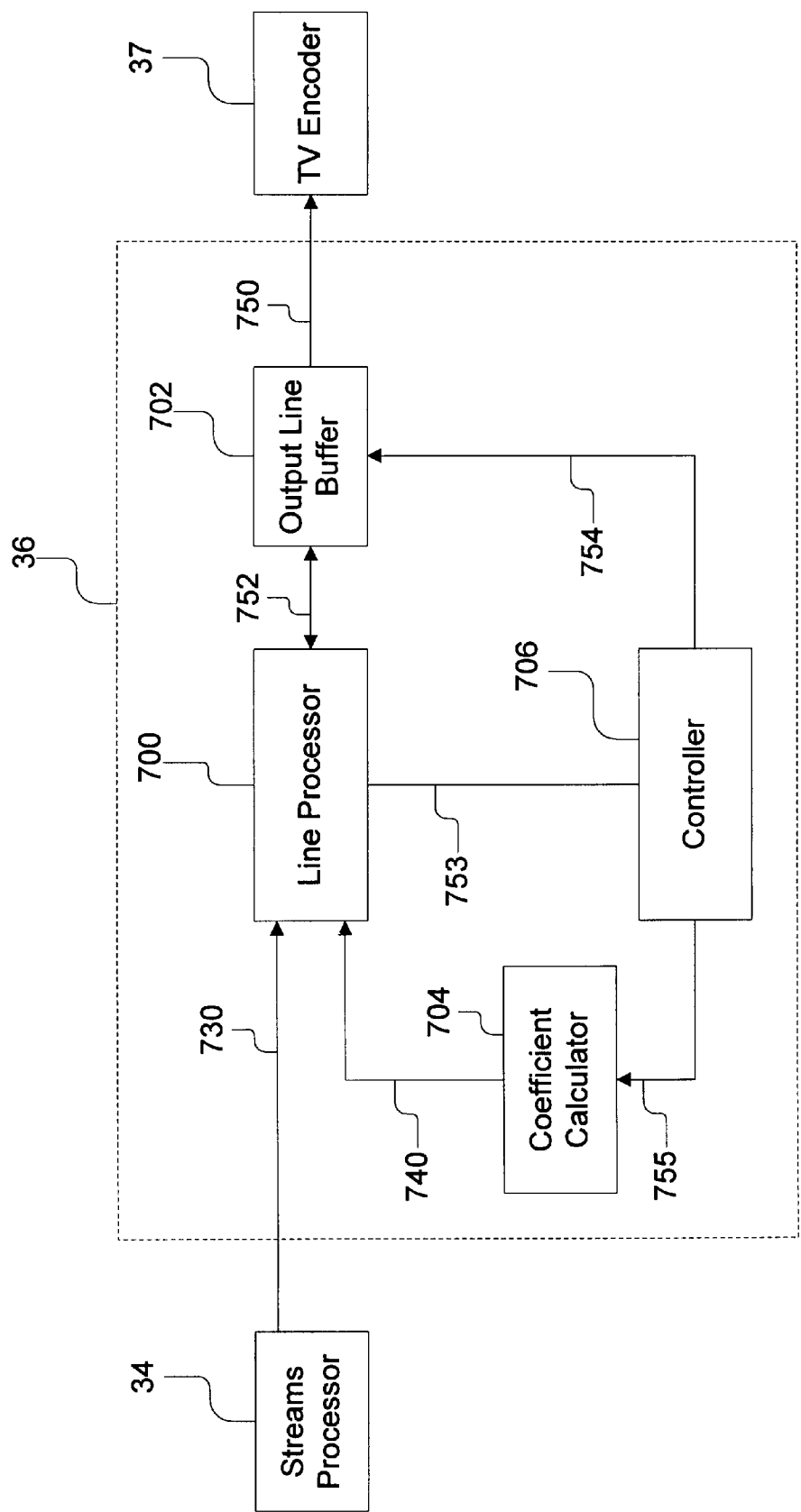
FIG. 7 is a block diagram of a first and preferred embodiment of the overscan compensator of FIG. 1.

FIG. 7 is a block diagram of a preferred embodiment of the overscan compensator 36 shown coupled between the streams processor 34 and the television 38. The overscan compensator 36 preferably includes a line processor 700, an output line buffer 702, a coefficient calculator 704, and a controller 706. The line processor 700 is coupled to receive original lines 200 on signal line 730 from the streams processor 34 and coefficients Cn on signal line 740 from the coefficient calculator 704. The line processor 700 is also coupled to send compensated lines via signal line 752 to the output line buffer 702, which is coupled to transmit compensated lines on signal line 750 to the television 38 for display. The controller 706 is coupled to control the line processor 700, the output line buffer 702 and the coefficient calculator 704 via the control signals lines 753, 754, and 755, respectively.

In general, the line processor 700 receives original lines 200 on signal 730 from the streams processor 34 and the corresponding coefficients on line 740 from the coefficient calculator 704. The line processor 700 then forms a weighted sum of the original lines 200, weighting the lines 200 according to the coefficients. The weighted sum is the compensated line applied to line 752 which is then transmitted to the output line buffer 702.

For example, referring to the compensated line L1" in FIG. 3, the line processor 700 receives original line L1 from the streams processor 34 and the coefficient ⁷⁄₂₈ from the coefficient calculator 704 and then multiply the two quantities together to form the partial sum ⁷⁄₂₈L1, storing the result internally. The line processor 700 then receives the original line L2 from the streams processor 34 and the coefficient ¹⁴⁄₂₈ from the coefficient calculator 704. The line processor 700 then forms the product ¹⁴⁄₂₈L2 and adds this product to the existing partial sum ⁷⁄₂₈L1 to form the new partial sum ⁷⁄₂₈L1 +¹⁴⁄₂₈L2. This process is repeated until the complete partial sum for the compensated line L1" is formed. The line processor 700 then transmits the completed partial sum, which is also the compensated line 752, to the output line buffer 702 for display on the television 38.

The controller 706 controls this process via the control signal lines 753, 754 and 755. Signal line 753 will be discussed in further detail below with respect to various embodiments of the line processor 700. Transmission to and from the line buffer 702 is controlled by control signals 754, which typically includes write-enable and read-enable signals for the line buffer 702. Control signal 755 ensures that the coefficient calculator 704 provides the correct coefficients 740 to the line processor 700. The signals 755 may include the index I, variable D, as well as timing signals.

The controller 706 may be implemented in various forms. For example, it may be a finite state machine implemented directly in silicon. Alternately, it may be a combination of hardware and software, or software implemented in a general purpose microcontroller. Other embodiments will be apparent to those of ordinary skill in the art based on the above description of operation and the timing diagrams described below.

The coefficient calculator 704 may similarly be implemented in various forms. As one example, the coefficient calculator 704 is a look-up table, either in hardware or software. Alternately, the coefficient calculator 704 may actually calculate the coefficients according to the methods of FIGS. 5B or 6B. Other embodiments will be apparent from the description that follows.

Figure 8:
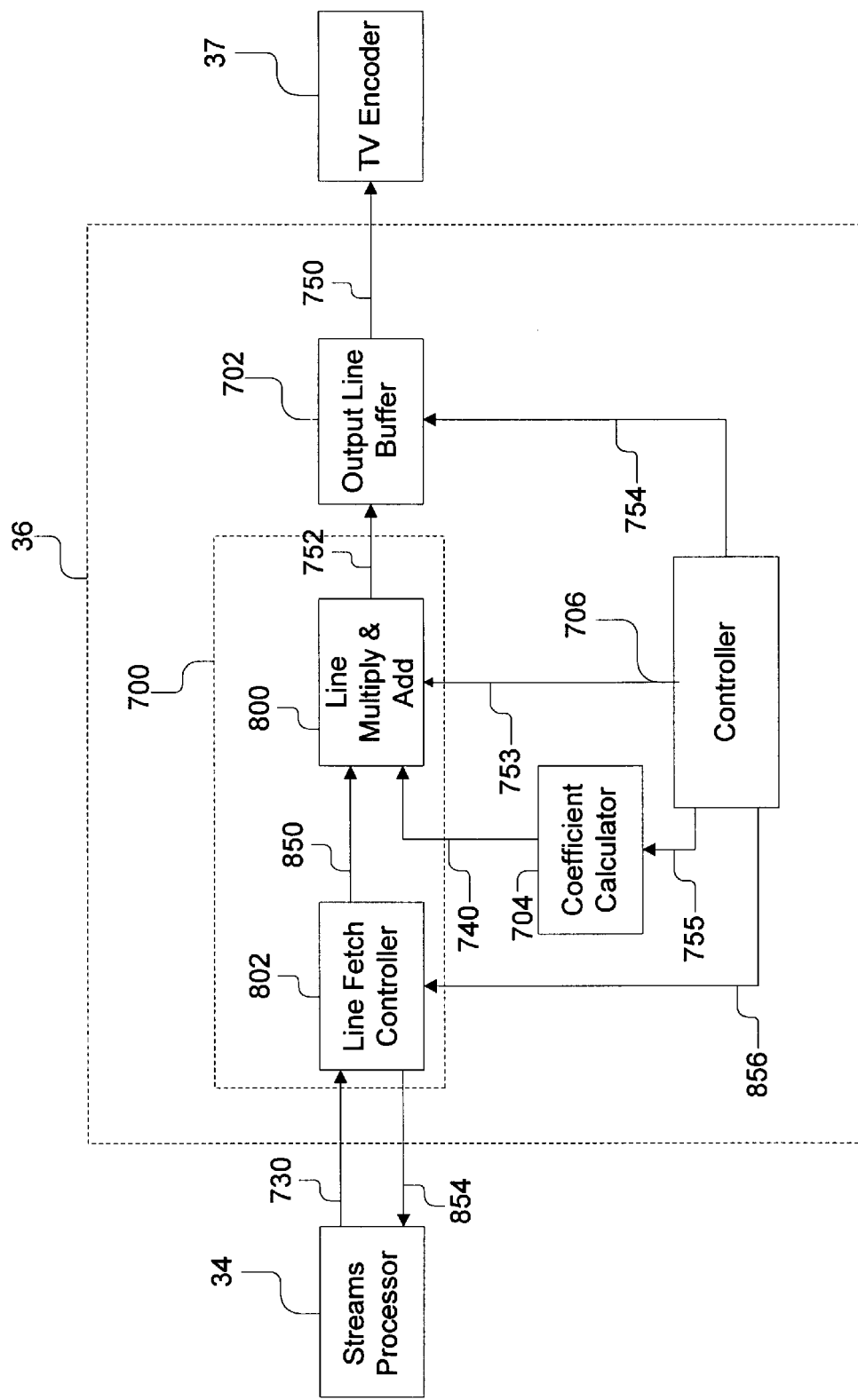
FIG. 8 is a block diagram of one embodiment of the line processor of FIG. 7.

FIG. 8 is a block diagram of one embodiment of the line processor 700. For clarity, the entire overscan compensator 36 is shown, and like numbers have been used for like parts for convenience and ease of understanding. The line processor 700 includes a line multiply-and-add circuit 800 and a line fetch controller 802. The line multiply-and-add circuit 800 is coupled to receive original lines 200 via line 850 from the line fetch controller 802 and to receive coefficients via line 740 from the coefficient calculator 704. The line multiply-and-add circuit 800 is also coupled to output compensated lines via signal line 752 to the output line buffer 702. The line multiply-and-add circuit 800 is coupled to receive control signals 852 from the controller 706. The line fetch controller 802 is coupled by signal line 854 to send line numbers to the streams processor 34 and also coupled to receive the corresponding original lines 200 via signal line 730 from the streams processor 34. The line fetch controller 802 is also coupled to receive control signals via signal line 856 from the controller 706.

Figure 9:
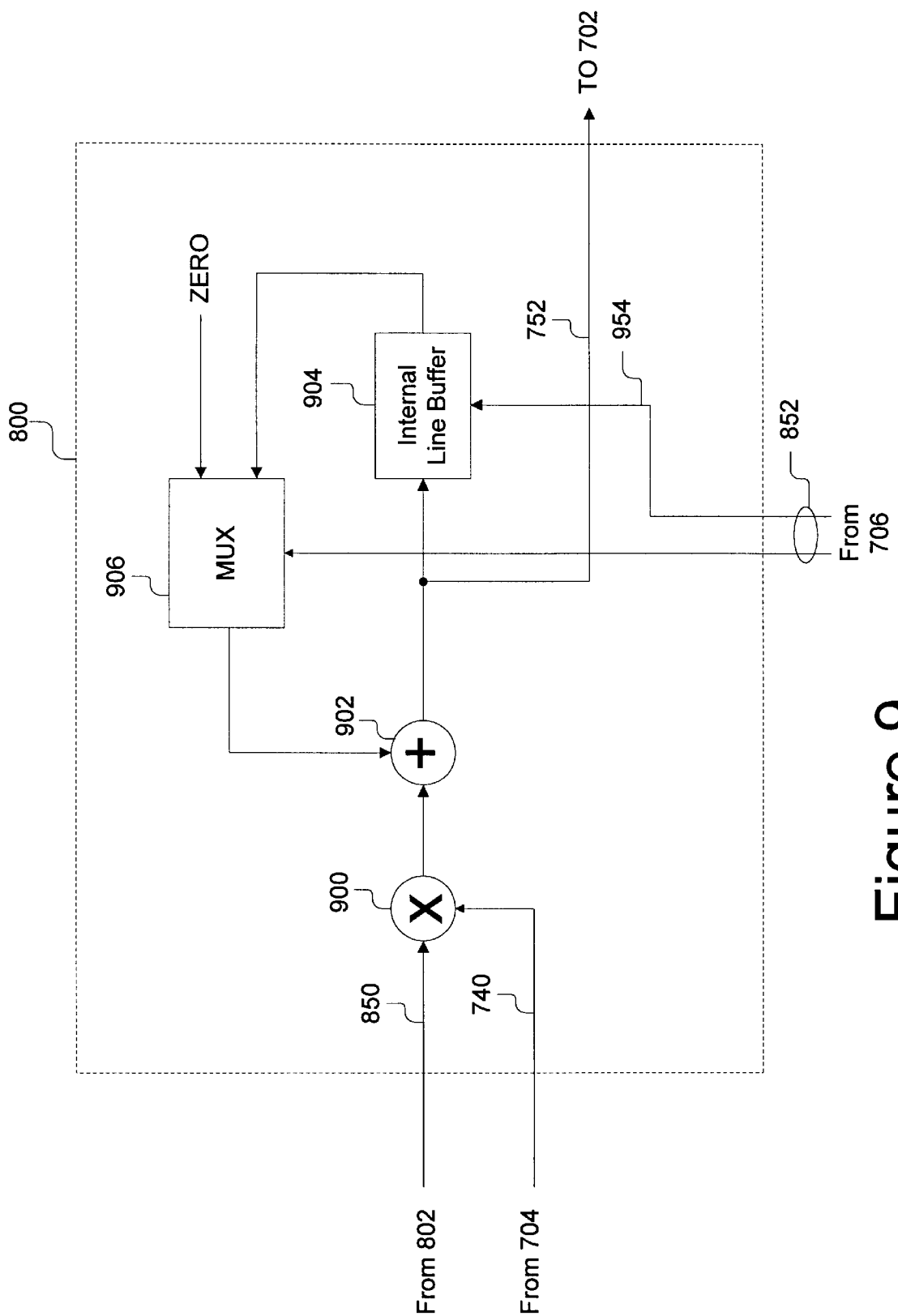
FIG. 9 is a block diagram of a preferred embodiment of the line multiply-and-add of FIG. 8.

FIG. 9 is a block diagram of a preferred embodiment of the line multiply-and-add circuit 800 of FIG. 8. The line multiply-and-add circuit 800 preferably comprises a multiplier 9, an adder 902, an internal line buffer 904 and a multiplexer 906. The multiplier 900 has a first input coupled to receive original lines 200 on line 850 from the line fetch controller 802 and a second input coupled to receive coefficients by line 740 from the coefficient calculator 704. The adder 902 similarly has a first input and a second input. The first input of the adder 902 is coupled to the output of the multiplier 900 to receive the product produced by the multiplier 900 and the second input of the adder 902 is coupled to the output from the multiplexer 906. The output of the adder 902 is coupled to an input of the internal line buffer 904 and provides the external output of the line multiply-and-add circuit 800 for sending compensated lines on line 752 to the output line buffer 702. The internal line buffer 904 has its output coupled to one input of the multiplexer 906; the other multiplexer input receives a constant zero input. The internal line buffer 904 and multiplexer 906 both receive control signals via signal line 852 from the controller 706. The control signals on signal line 852 are typically made up of readenable and write-enable signals on line 954 for controlling the internal line buffer 904, and a select signal line 956 coupled to the control input of the multiplexer 906.

The line multiply-and-add circuit 800 produces the completed partial sum in the following manner. Referring again to the compensated line L1" of FIG. 3, the multiplier 900 first receives the original line L1 and the coefficient $7/28$. The multiplier 900 multiplies these two quantities together to form the product $7/28$L1 at its output. The adder 902 receives and adds this product to zero, which is provided by the multiplexer 906. The output of the adder 902 is then the partial sum $7/28$L1, which is written to the internal line buffer 904. The multiplier 900 next receives the original line L2 and the coefficient $14/28$. The multiplier 900 forms the product of these two quantities and passes the product to the first input of the adder 902. The multiplexer 906 couples the output of the internal line buffer 904 to its output, thus asserting the partial sum $7/28$L1 at the second input to the adder 902. The adder 902 adds the product $14/28$L2 to the existing partial sum $7/28$L1 to form the new partial sum $7/28$L1+$14/28$L2, which is then written to the internal line buffer 904. This process is repeated until the complete partial sum is formed, at which time the compensated line 752 is written to the output line buffer 702.

Figure 10:
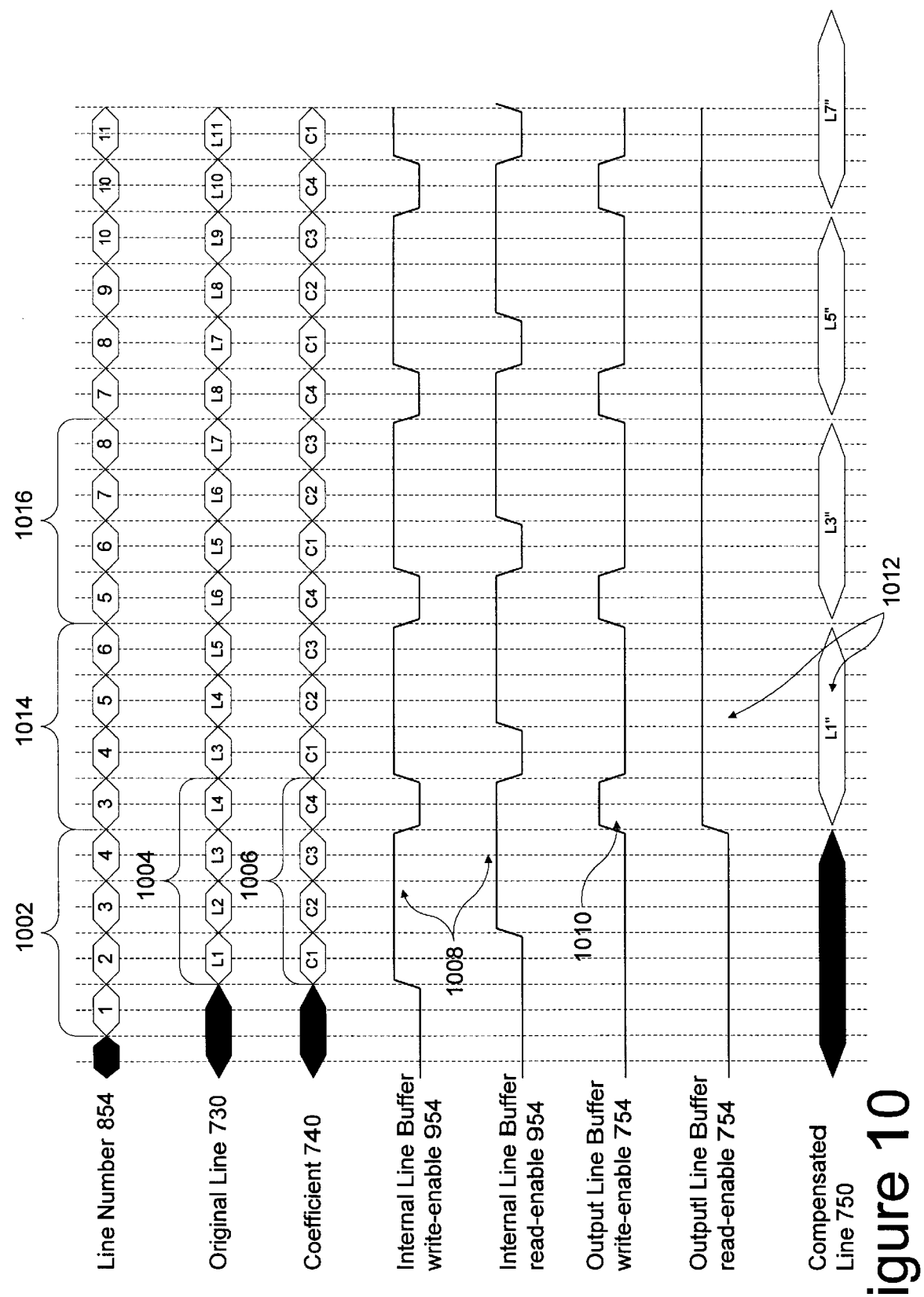
FIG. 10 is a timing diagram illustrating the operation of the overscan compensator of FIG. 8, in accordance with the method illustrated in FIG. 3.

FIG. 10 shows a timing diagram illustrating the operation of the overscan compensator 36 of FIGS. 8–9 in more detail. The line numbers are sent from the line fetch controller 802 to the streams processor 34, with the original lines 200 returned on line 730 in response. The coefficients are provided on line 740 and received by the line multiply-and-add circuit 800. The internal line buffer write-enable and read-enable signals on lines 954, 956 control writing and reading to the internal line buffer 904. The output line buffer write-enable and read-enable signals on line 754 similarly control the output line buffer 702. The compensated line provided on signal line 750 is sent to the television 38 for display.

The operation of the embodiment of FIGS. 8–9 is based on random fetching of the original lines 200 from the streams processor 34. That is, the line fetch controller 802 is capable of fetching the original lines 200 from the streams processor 34 in any order. This embodiment has an advantage of requiring only a single line multiply-and-adds circuit 800 and line buffer 702 but adds some complexity in the line fetch controller 802.

Referring also to FIG. 3, to form L1", the line fetch controller 802 must fetch the original lines L1–L4; while the coefficient calculator 704 supplies the corresponding coefficients C1–C4. Strictly speaking, only lines L1–L3 and coefficients C1–C3 are required to form L1", but four lines and coefficients are fetched so that the weighted sum always contains four terms. C4 is simply set to zero.

Referring to FIG. 10, the line fetch controller 802 fetches the lines L1–L4 by sending 1002 line numbers 1–4 on line 854 to the streams processor 34. The streams processor 34 responds by sending 1004 lines L1–L4 730 to the line fetch controller 802, which forwards these lines to the line multiply-and-add circuit 800. The coefficient calculator 704 simultaneously supplies 1006 the coefficients C1–C4 on signal line 740 to the line multiply-and-add circuit 800. The line multiply-and-add circuit 800 forms 1008 the compensated line L1" via the partial sum process described previously, as controlled by the internal line buffer write-enable and read-enable signals asserted on signal line 954. Once the completed partial sum is formed, it is written 1010 to the output line buffer 702. The compensated line L1" 750 may then be read 1012 from the output line buffer 702 to the television 38 for display. While the compensated line 1012 is shown in FIG. 10 as extending for the duration of four input lines, those skilled in the art will realize that the portions at the beginning and the end of the compensated line 1012 are blank.

After L1" is formed, the overscan compensator 36 then proceeds to form L3" in an analogous fashion. It begins by sending 1014 line numbers 3–6 to the streams processor 34. After L3", the overscan compensator 36 sends 1016 line numbers 5–8 to the streams processor 34 in order to form compensated line L5". This process is repeated until the entire odd field has been formed. In this embodiment, the compensated lines are formed serially. L1" is formed first, then L3" is formed, then L5", etc.

As shown by the timing diagram, the coefficients and the original lines are provided at four times the rate, and in a pipelined order such that after four consecutive lines, the compensated line has been formed. The additional complexity imposed on the controller 706 is providing the coefficients in a repeating order of C1, C2, C3, C4, C1 . . . appropriately timed with the retrieval of the original lines L1, L2, L3, L4, L3, L4, L5, L6, L5, L6, L7, L8 . . . . Those skilled in the art will realize that the present invention applies to any of the standard formats, so long as the input line rate is four times the output line rate.

From FIG. 10, it can be seen that four original lines 730 must be received for each compensated line 750 which is formed. Hence, in order to support the output rate, the input line rate for the original lines 730 must be clocked in at least four times faster. Those skilled in the art will realize that the invention may be applied to a variety of faster and slower clock speed for video formats having a higher or lower density of pixels per frame.

Figure 11:
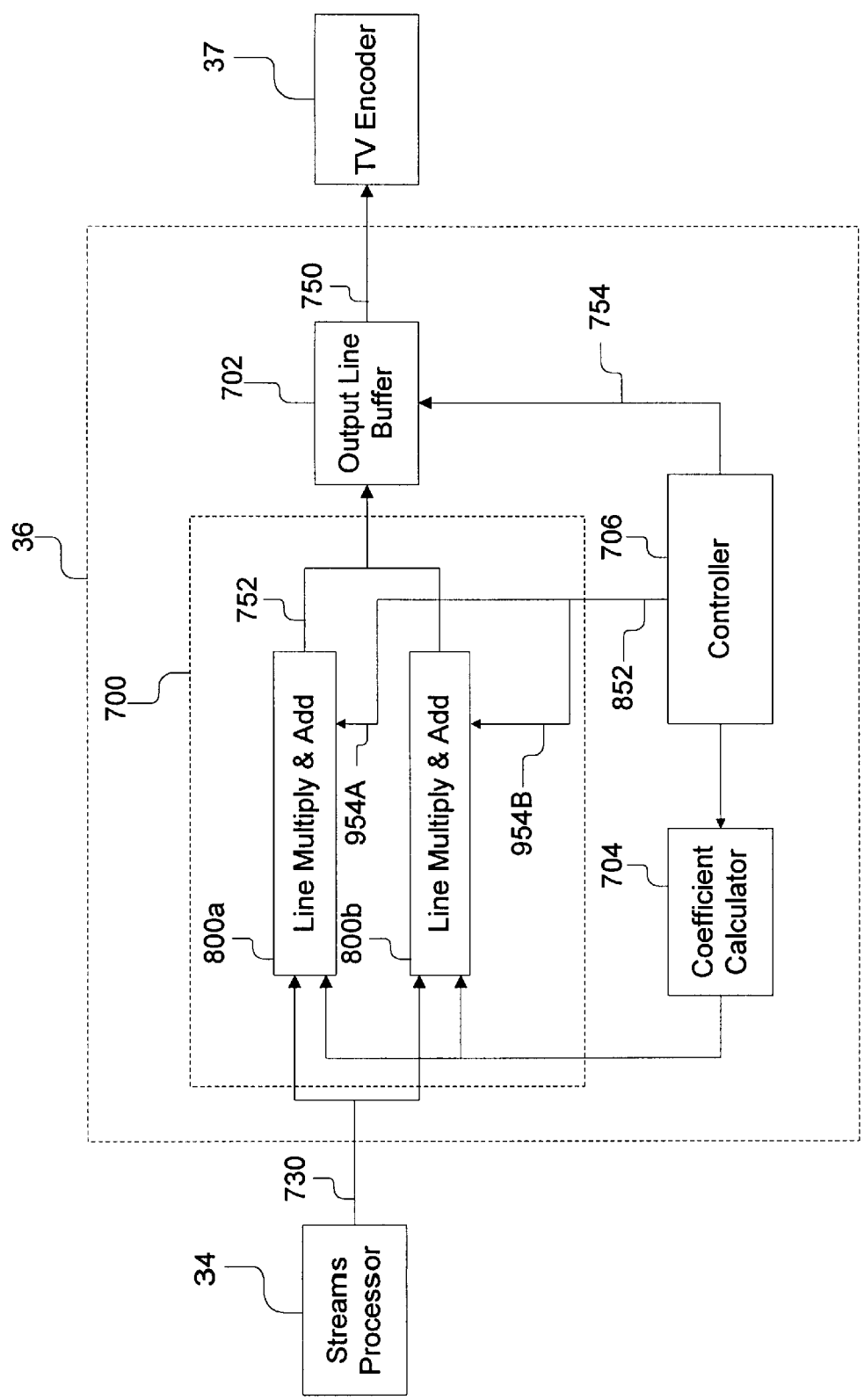
FIG. 11 is a block diagram of a second embodiment of the line processor of FIG. 7.

FIG. 11 is a block diagram of another embodiment of the line processor 700a. In this embodiment, the line processor 700a includes two line multiply-and-adds circuits 800A and 800B. Each of the line multiply-and-add circuits 800A–800B is of the type shown in FIG. 9. Each line multiply-and-add circuit 800A–800B has an input coupled to signal line 730 to receive original lines 200 from the streams processor 34 and a second input coupled to line 740A, 740B, respectively, to receive coefficients from the coefficient calculator 704. Each line multiply-and-add circuit 800A–800B is also coupled via signal line 752 to output compensated lines to the output line buffer 702 and to receive control signals 852, typically including respective read-enable and write-enable signals 954A and 954B, from the controller 706. The remaining components of the embodiment are the same as that show in FIG. 8, and like parts indicated like circuits having the same functionality.

This embodiment is based on receiving the original lines 200 sequentially from the streams processor 34. That is, the streams processor 34 outputs line L1, then L2, then L3, etc., until all of the original lines for a particular frame have been outputted. This embodiment operates by calculating several compensated lines in parallel. Referring to FIG. 3, it may be noticed that any one original line is used in the calculation of no more than two compensated lines. For example, the original line L5 appears only in the expressions for L2"–L5". However, only two of these four compensated lines would be formed by the compensator 36 since the interlaced output will use only either the odd or the even compensated lines. This embodiment has advantages of simple control for fetching of the original lines and generally slower clocking requirements, but requires parallel hardware.

Figure 12:
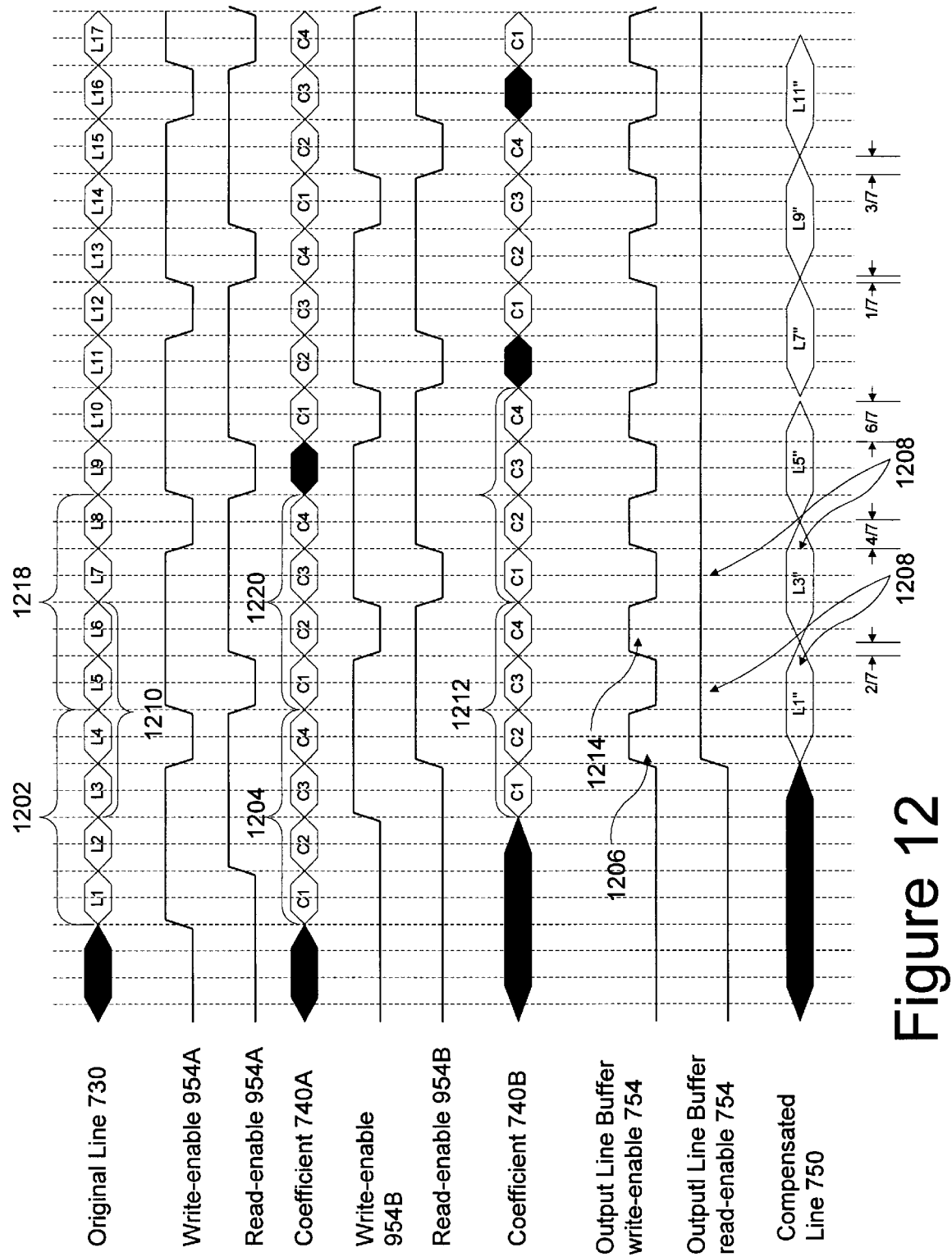
FIG. 12 is a timing diagram illustrating the operation of the overscan compensator of FIG. 11, in accordance with the method illustrated in FIG. 3.

FIG. 12 is a timing diagram illustrating the operation of the overscan compensator 36 of FIG. 11. Original lines 200 on signal line 730, output write- and read-enable signals on signal line 754, and compensated line output on line 750 are the same as in FIG. 10. The embodiment of FIG. 11, however, has a two line multiply-and-add circuits 800A–B. Hence, FIG. 12 includes two write- and read-enable signals 954A–B for controlling the respective internal line buffers of each line multiply-and-add 800A–B and also includes two coefficient signal lines 740A–B, for providing one coefficient to each line multiply-and-add circuit 800A–B.

Still referring to FIG. 12, the line multiply-and-add circuit 800A receives 1202 original lines L1–L4 and also receives 1204 corresponding coefficients C1–C4. The first line multiply-and-add circuit 800A then forms compensated line L1" from these inputs. Once the completed partial sum for L1" is formed, it is written 1206 to the output line buffer 702, where it is then be transmitted 1208 to the television 38. Overlapping in time, the second line multiply-and-add circuit 800B forms the compensated line L3". The second line multiply-and-add 800B receives 1210 lines L3–L6 and also receives 1212 coefficients C1–C4. The second line multiply-and-add circuit 800B forms the compensated line L3" which it transmits 1214 to the output line buffer 702 to be subsequently outputted 1216 to the television 38. The overlap in time occurs because, for example, line L3 is only transmitted once by the streams processor 34. Therefore, when it is transmitted, the first and second line multiply-and-add circuits 800A and 800B must both receive the line in order to form their corresponding compensated lines. After the first line multiply-and-add 800A forms compensated line L1", it forms compensated line L5" by receiving 1218 lines L5–L8 and also receiving 1220 coefficients C1–C4. This process continues until the entire field has been formed. In FIGS. 8–10, the pixels for the original lines 730 must clock in at a line rate 16/7 times faster than the rate at which the compensated lines are output, since for every 16 original lines, 7 compensated lines are formed.

Figure 15:
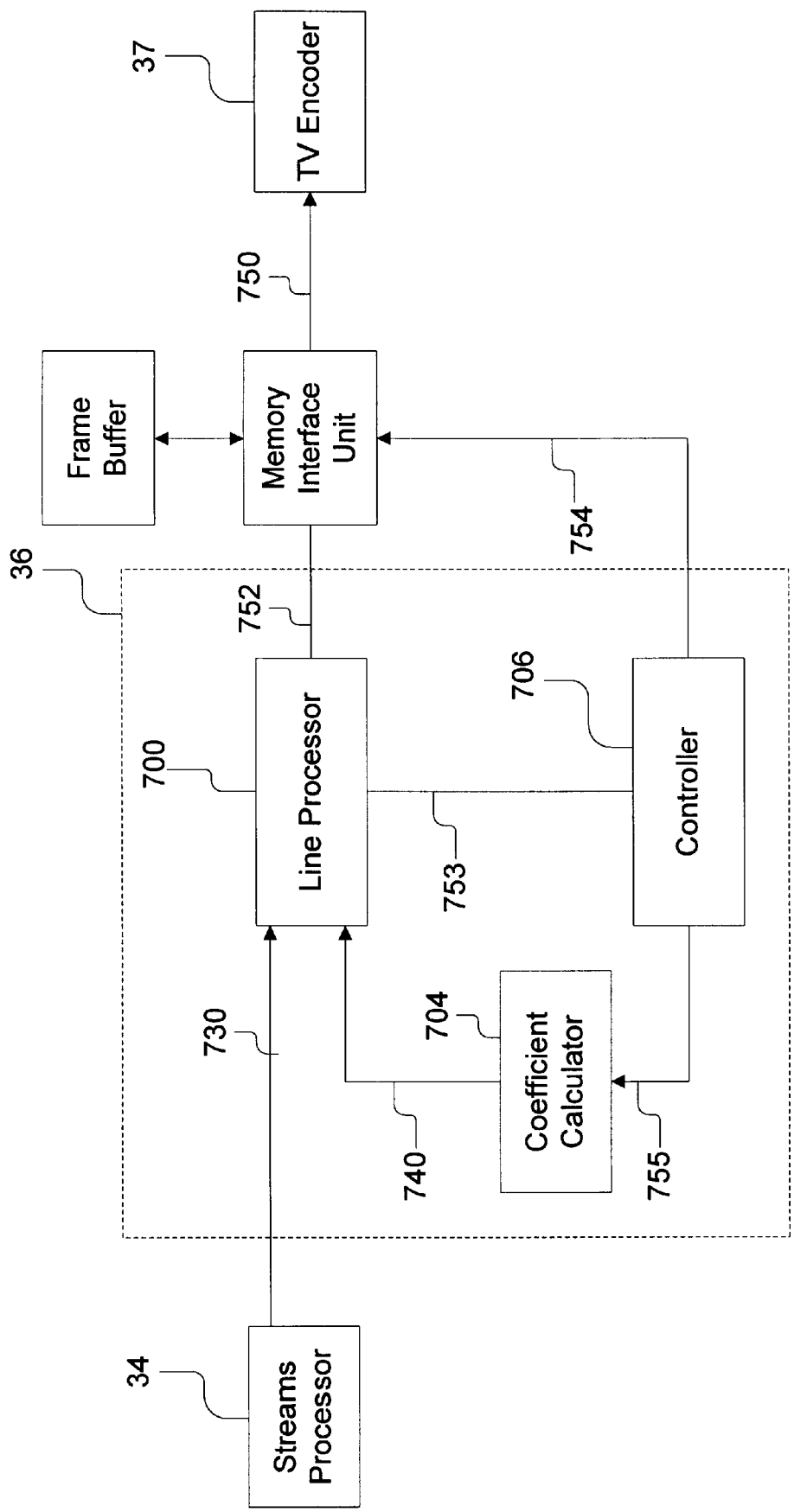
FIG. 15 is a block diagram of a second embodiment of a system including the present invention.

Another implementation is to write all the line data into a frame buffer. In this case, the read-out from and write-in to the frame buffer are not strongly constrained. Once a field is formed, the line data is simply read out of the frame buffer. An exemplary embodiment of such an implementation is shown in FIG. 15.

Figure 13:
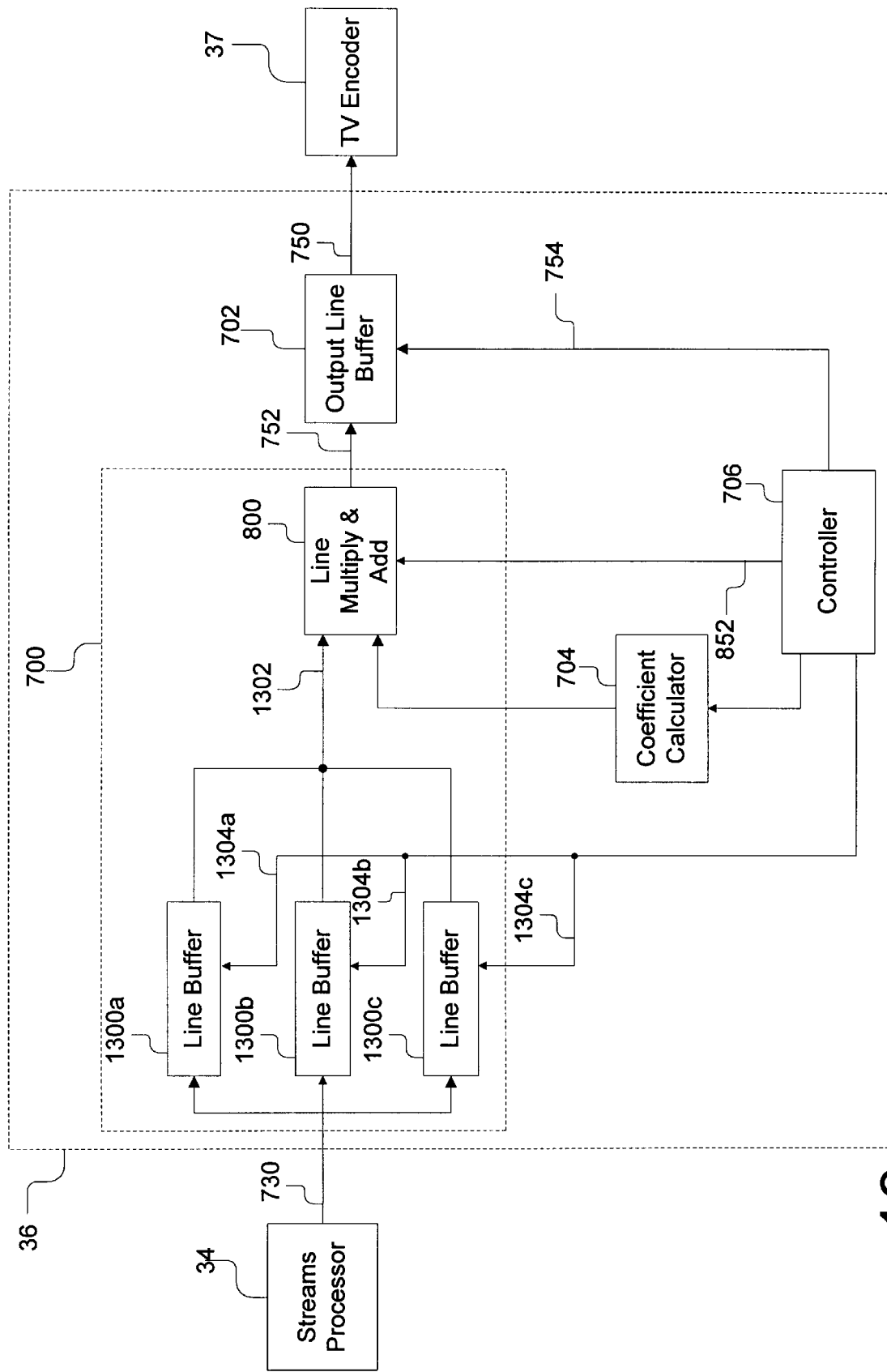
FIG. 13 is a block diagram of a third embodiment of the line processor of FIG. 7.

Referring now to FIG. 13, a block diagram of yet another embodiment of the line processor 700c is shown. In this third embodiment, the line processor 700c includes a line multiply-and-add circuit 800C which may be of the type in FIG. 9 and three line buffers 1300A, 1300B and 1300C. The line multiply-and-add 800c is coupled to receive original lines 200 via signal line 1302 to which the output of the line buffers 1300A–C are coupled, and coefficients via line 740 from the coefficient calculator 704. The line multiply-and-add circuit 800C is also coupled to output compensated lines on line 752 to the output line buffer 702 and to receive control signals on line 852 from the controller 706. Each of the line buffers 1300A–C is also coupled to receive original lines 200 and has its input coupled to line 730 from the streams processor 34 and a respective control input coupled to receive control signals on signal lines 1304A–C from the controller 706.

In this embodiment, the streams processor 34 again outputs original lines 200 sequentially, as in the embodiment of FIG. 11. However, rather than calculating several compensated lines in parallel, as in the embodiment of FIG. 11, this embodiment stores the most recently received original lines 730 in line buffers 1300A–C on a rotating basis. The line multiply-and-add circuit 800c then forms the compensated lines serially, as in the embodiment of FIG. 8, but retrieving the original lines as required from the line buffers 1300A–C rather than from the streams processor 34 as was the case in FIG. 8. This embodiment has an advantage of needing only a single line multiply-and-add circuit 800 compared to the embodiment of FIG. 11, but requires more line buffers 1300A–C and more complex control for reading and writing to the line buffers 1300A–C. Compared to the embodiment of FIG. 8, this embodiment has an advantage of simple control for fetching the original lines 730 from the streams processor 34.

Figure 14:
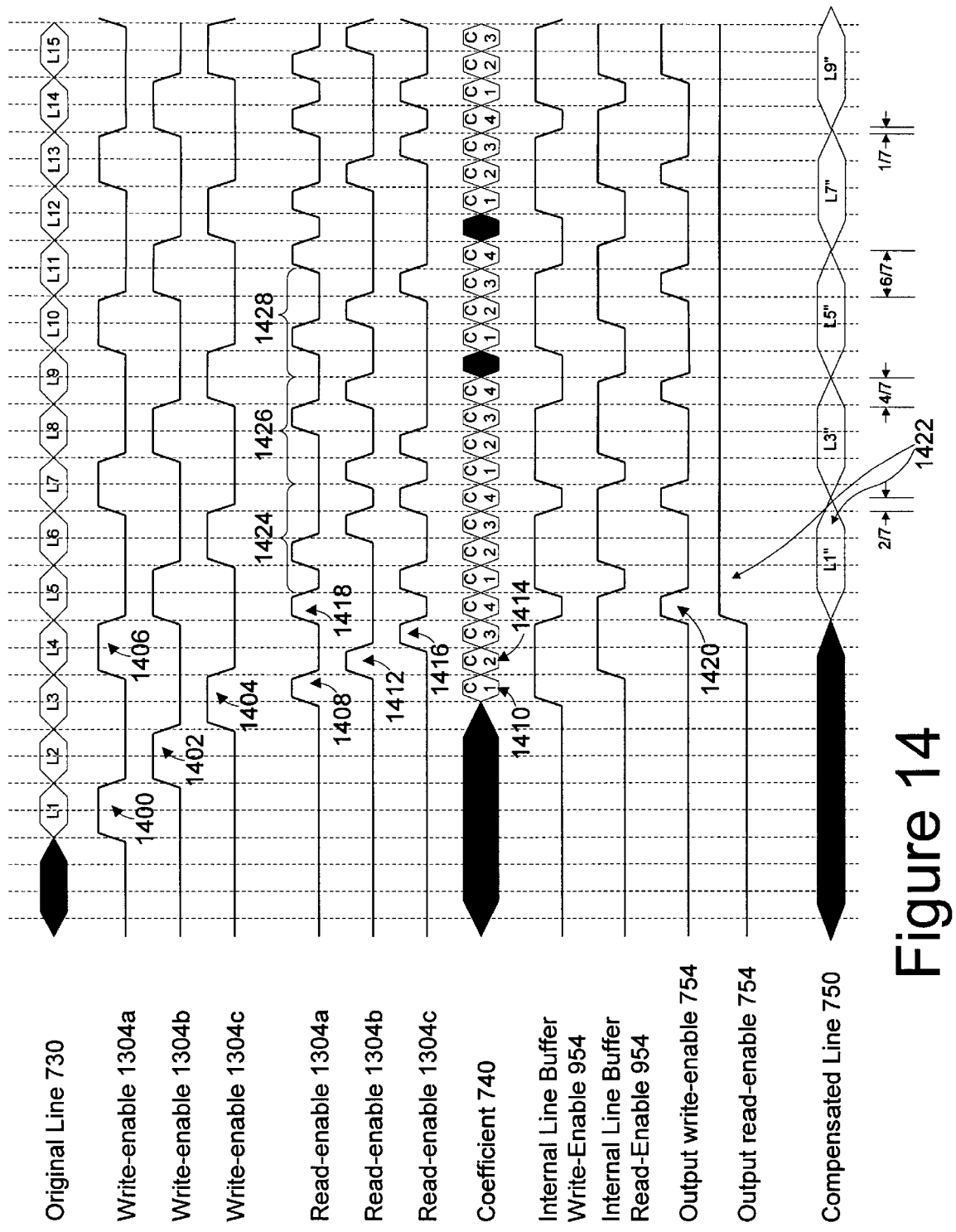
FIG. 14 is a timing diagram illustrating the operation of the overscan compensator of FIG. 13, in accordance with the method illustrated in FIG. 3.

FIG. 14 is a timing diagram illustrating the operation of the overscan compensator 36 of FIG. 13. The original lines on line 730, coefficient on line 740, write- and read-enable signals on line 754 (part of line 852), output write- and read-enable signals 754, and compensated line 750 are the same as in FIG. 10. The three write- and read-enable signals 1304A–C control operation of the three line buffers 1300A–C, respectively.

In FIG. 14, the write-enable signals 1304A–C indicate to which line buffer 1300A–1300C a specific original line 200 is written. For example, line Li is written 1400 to line buffer 1300A; L2 is written 1402 to buffer 1300B; L3 is written 1404 to buffer 1300C; L4 is written 1406 to buffer 1300A thus overwriting L1, and so on. Formation of the compensated lines L1", L3", etc., can be understood by referring to the read-enable signals 1304A–C for line buffers 1300A–C and the coefficients 740 passed to the line multiply-and-add circuit 800c. The line multiply-and-add circuit 800c first forms the compensated line L1" by receiving 1408 line L1 from line buffer 1300A, receiving 1410 coefficient C1, and combining the two lines to form the first partial sum. The line multiply-and-add circuit 800c then forms the next partial sum by receiving 1412 line L2 from line buffer 1300B, receiving 1414 coefficient C2, and combining these with the previous partial sum. The compensated line L1" is completed by receiving 1416 line L3 from line buffer 1300C, receiving 1418 line L4 from line buffer 1300A, and combining these lines with their corresponding coefficients. The completed partial sum for L1" is then output 1420 to the output line buffer 702 where it may be transmitted 1422 to the television 38.

Similarly, compensated line L3" may be formed during the time period 1424, L5" during the time period 1426, etc. The pixels for the original lines 730 must clock in at a line rate 16/7 times faster than the rate which the compensated lines are output, for the same reasons as have been described above with reference to FIG. 12. If the timing cannot be met, all the line data can be stored into a frame buffer then read out. The read out and write in rates will not be so tightly constrained and therefore are less critical.

Although the invention has been described in considerable detail with reference to certain preferred embodiments thereof, other embodiments are possible. For example, the invention can be incorporated into an integrated circuit on a semiconductor device using techniques known in the art. Therefore, the spirit and scope of the appended claims should not be limited to the description of the preferred embodiments contained herein.

What is claimed is:

1. A device for simultaneously flicker filtering and vertically contracting a plurality of original lines, the device comprising:

a coefficient calculator for generating and outputting compensation coefficients signals;

a line processor coupled to receive compensation coefficients from the coefficient calculator and adapted to receive original lines, the line processor for combining the received original lines with the received compensation coefficients to form compensated lines; the line processor including:

a multiplier coupled to receive an original line and a compensation coefficient signal, the multiplier forming the product of the received original line with the received compensation coefficient;

an adder coupled having a first and a second inputs, the first input coupled to receive the product from the multiplier, the adder for adding values at the first input and the second input to form a partial sum;

an internal line buffer coupled to the adder to receive the partial sum;

a multiplexer having a first input, a second input and an output, the multiplexer coupled to a controller, the first input of the multiplexer coupled to receive the partial sum and the second input coupled to receive a zero input, the output of the multiplexer coupled to the second input of the adder, the multiplexer for coupling either the partial sum or the zero input to the second input of the adder in response to a control signal from the controller; and wherein the controller is coupled to control the coefficient calculator and the line processor, and the controller synchronizes the receipt of original lines with the receipt of compensation coefficients by the line processor.

2. The device of claim 1, wherein the controller is a finite state machine controller.

3. The device of claim 1 further comprising:

an output line buffer coupled to receive the compensated lines from the line processor; and wherein the controller is coupled to control the output line buffer, the controller for controlling the transfer of compensated lines from the line processor to the output line buffer.

4. The device of claim 1 wherein the line processor is adapted to form a weighted sum of the received original lines, weighting of the original lines determined by received compensation coefficient signal, each weighted sum including not more than five original lines.

5. A device for simultaneously flicker filtering and vertically contracting a plurality of original lines, the device comprising:

a coefficient calculator for generating and outputting coefficient signals;

a line processor coupled to receive the coefficient signals from the coefficient calculator and adapted to receive original lines, the line processor combining the received original lines with the received coefficient signals to form compensated lines;

a controller coupled to control the coefficient calculator and the line processor, the controller for synchronizing the receipt of original lines with the receipt of coefficient signals by the line processor; and wherein the line processor includes a line fetch controller adapted to receive original lines in response to output of line numbers, the line fetch controller coupled to the controller for receiving control signals, the line numbers generated in response to the control signals; and a line multiply-and-add circuit coupled to receive the original lines from the line fetch controller.

6. The device of claim 5, wherein the line processor further includes a plurality of line multiply-and-add circuits, each line multiply-and-add circuit adapted to receive the original lines and coupled to receive the coefficient signals from the coefficient calculator, the line multiply-and-add circuits for forming a plurality of compensated lines in parallel.

7. A device for simultaneously flicker filtering and vertically contracting a plurality of original lines, the device comprising:

a coefficient calculator for generating and outputting coefficient signals;

a line processor coupled to receive compensation coefficients from the coefficient calculator and adapted to receive original lines, the line processor for combining the received original lines with the received compensation coefficients to form compensated lines; the line processor including a plurality of line buffers, each line buffer adapted to receive the original lines from a streams processor, each line buffer controlled by a controller; and a line multiply-and-add circuit coupled to receive the original lines from the plurality of line buffers; and wherein the controller is coupled to control the coefficient calculator and the line processor, and the controller synchronizes the receipt of original lines with the receipt of compensation coefficients by the line processor.

8. A method for simultaneously flicker filtering and vertically contracting a plurality of original lines, the method comprising the steps of:

determining flicker coefficients for flicker filtering lines, wherein the flicker coefficients are based on a filter having coefficients of ($\frac{1}{2}*(1-f)$, f, $\frac{1}{2}*(1-f)$) where $0 < f < 1$:

determining contraction coefficients for vertically contracting lines;

combining the flicker coefficients and contraction coefficients into compensation coefficients, and forming a plurality of weighted sums of the original lines, weighting of the original lines by the compensation coefficients.

9. The method of claim 8 wherein the step of combining the flicker coefficients and contraction coefficients is based on vertically contracting the original lines and flicker filtering the vertically contracted lines.

10. The method of claim 8 wherein the step of combining the flicker coefficients and contraction coefficients is based on flicker filtering the original lines and vertically contracting the flicker filtered lines.

11. The method of claim 8 wherein the flicker coefficients are based on f having a value of ½ and thus (¼, ½, ¼).

12. The method of claim 8 wherein the possible values of f include 2/16, 4/16, 6/16, 10/16, 12/16, 14/16.

13. The method of claim 8 wherein the contraction coefficients are based on bilinear interpolation.

14. The method of claim 8 wherein each weighted sum is a weighted sum of not more than five original lines.

15. The method of claim 8 wherein each weighted sum is a weighted sum of not more than four original lines.

16. The method of claim 8 further comprising the step of rendering the plurality of weighted sums on a display device.

17. The method of claim 8 wherein the step of forming the plurality of weighted sums, for each weighted sum, includes:

retrieving an original line required to form the weighted sum;

retrieving a compensation coefficient corresponding to the original line;

adding the product of the compensation coefficient and the original line to a partial sum; and repeating the steps of retrieving the original line, retrieving the compensation coefficient, and adding the product to the partial sum, until the partial sum is completed.

18. The method of claim 8 wherein the step of forming the plurality of weighted sums includes:

retrieving the original lines included in a first weighted sum; and completing a partial sum for the first weighted sum before beginning a partial sum for a next weighted sum.

19. The method of claim 8 wherein the step of forming the plurality of weighted sums includes:

receiving the original lines in a sequential order; and forming, in parallel, partial sums for every weighted sum which includes a most recently received original line.

20. The method of claim 8 wherein the step of forming the plurality of weighted sums includes:

receiving the original lines in a sequential order; and completing a partial sum for a first weighted sum before beginning a partial sum for a next weighted sum, the first weighted sum including a plurality of the most recently received original lines.

21. A method for simultaneously flicker filtering and vertically contracting a plurality of original lines, the method comprising the steps of:

determining compensation coefficients for simultaneously flicker filtering and vertically contracting the original lines, wherein the original lines are vertically contracted by a factor $N/(N+1)$; each compensated line is characterized by an index I; and the compensation coefficients are given by $C1=1/(4N)$, $C2=(N-1)/(4N)$, $C3=½$, $C4=(N-1)/(4N)$, $C5=1/(4N)$, if $I=0$; by $C1=(N-I-1)/(4N)$, $C2=(2N-I-1)/(4N)$, $C3=(2I)/(4N)$, $C4=¼$, and $C5=0$, if $I=n-1$; and by $C1=(N-I+1)/(4N)$, $C2=(2N-I-1)/(4N)$, $C3=(N+I-1)/(4N)$, $C4=(I+1)/(4N)$, $C5=0$, otherwise; and forming a plurality of weighted sums of the original lines, by weighting the original lines by the compensation coefficients.

22. A method for simultaneously flicker filtering and vertically contracting a plurality of original lines, the method comprising the steps of:

determining compensation coefficients for simultaneously flicker filtering and vertically contracting the original lines, wherein the original lines are vertically contracted by a factor $N/(N+1)$; each compensated line is characterized by an index I; and the compensation coefficients are given by $C1=(N-I)/(4N)$, $C2=(2N-I)/(4N)$, $C3=(N+I)/(4N)$, and $C4=(I)/(4N)$, if I is not equal to 0; and by $C1-½$, $C2-½$, and $C4=0$, if n is equal to 0; and forming a plurality of weighted sums of the original lines, by weighting the original lines by the compensation coefficients.

* * * * *